United States Patent
Baillargeon et al.

(10) Patent No.: US 10,341,901 B2
(45) Date of Patent: Jul. 2, 2019

(54) TUNNEL CONGESTION VOLUME POLICING

(71) Applicant: Telefonaktiebolaget LM Ericsson (publ), Stockholm (SE)

(72) Inventors: Steve Baillargeon, Gatineau (CA); Ingemar Johansson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 229 days.

(21) Appl. No.: 15/107,964

(22) PCT Filed: Nov. 24, 2014

(86) PCT No.: PCT/SE2014/051399
§ 371 (c)(1),
(2) Date: Jun. 24, 2016

(87) PCT Pub. No.: WO2015/142241
PCT Pub. Date: Sep. 24, 2015

(65) Prior Publication Data
US 2016/0323782 A1  Nov. 3, 2016

Related U.S. Application Data

(60) Provisional application No. 61/968,091, filed on Mar. 20, 2014.

(51) Int. Cl.
*H04W 28/12* (2009.01)
*H04L 12/46* (2006.01)
(Continued)

(52) U.S. Cl.
CPC ......... *H04W 28/12* (2013.01); *H04L 12/4633* (2013.01); *H04L 43/0835* (2013.01);
(Continued)

(58) Field of Classification Search
CPC ..... H04L 12/4633; H04L 43/08; H04L 47/10; H04L 47/11; H04L 47/20; H04L 47/31;
(Continued)

(56) References Cited

U.S. PATENT DOCUMENTS 6,996,062 B1    2/2006 Freed et al.
7,315,515 B2 *  1/2008 Pazos .................... H04L 1/1607
                                                       370/231
(Continued)

FOREIGN PATENT DOCUMENTS

EP    2731373 A1 *  5/2014   ........ H04W 28/0247
JP    2006109452 A    4/2006
(Continued)

OTHER PUBLICATIONS

Stevens, W. "TCP Slow Start, Congestion Avoidance, Fast Retransmit, and Fast Recovery Algorithms", Jan. 1997, IETF Network Working Group, Request for Comments: 2001, pp. 1-6 (Year: 1997).*
(Continued)

*Primary Examiner* — Un C Cho
*Assistant Examiner* — Shah M Rahman
(74) *Attorney, Agent, or Firm* — Withrow & Terranova, PLLC

(57) ABSTRACT

There is provided a method performed by a first network node for enabling network congestion management in a wireless network. The method comprises the step of encapsulating and sending user packets in a tunnel to a second network node, wherein each packet comprises information related to a byte loss volume for the tunnel. The method further comprises the step of receiving congestion volume information for the tunnel from the second network node. The method also comprises either the step of applying network congestion policing for the tunnel based on the
(Continued)

received congestion volume information, or alternatively the step of forwarding the received congestion volume information to a third network node, to enable network congestion policing for the tunnel based on the received congestion volume information.

31 Claims, 26 Drawing Sheets

(51) Int. Cl.
  *H04W 28/02* (2009.01)
  *H04L 12/801* (2013.01)
  *H04L 12/833* (2013.01)
  *H04L 12/823* (2013.01)
  *H04L 12/813* (2013.01)
  *H04L 12/26* (2006.01)

(52) U.S. Cl.
  CPC ............. *H04L 47/10* (2013.01); *H04L 47/11* (2013.01); *H04L 47/20* (2013.01); *H04L 47/31* (2013.01); *H04L 47/32* (2013.01); *H04L 47/34* (2013.01); *H04W 28/0284* (2013.01); *H04L 43/0894* (2013.01)

(58) Field of Classification Search
  CPC ..... H04L 47/32; H04L 47/34; H04L 43/0835; H04L 43/0894; H04W 28/12; H04W 28/0284
  See application file for complete search history.

(56) References Cited

U.S. PATENT DOCUMENTS

| | | | | |
|---|---|---|---|---|
| 7,596,091 | B2* | 9/2009 | Sethi | H04L 47/10 370/234 |
| 7,742,420 | B2* | 6/2010 | Chapman | H04L 47/10 370/236 |
| 9,602,383 | B2 | 3/2017 | Baillargeon | |
| 2002/0089930 | A1* | 7/2002 | Aceves | H04L 1/1832 370/230 |
| 2004/0192312 | A1* | 9/2004 | Li | H04L 1/16 455/445 |
| 2007/0081454 | A1* | 4/2007 | Bergamasco | H04L 47/10 370/229 |
| 2008/0253289 | A1* | 10/2008 | Naven | H04L 47/10 370/236 |
| 2010/0046370 | A1* | 2/2010 | Ghose | H04L 1/1809 370/235 |
| 2011/0141904 | A1 | 6/2011 | Viger et al. | |
| 2012/0051216 | A1 | 3/2012 | Zhang et al. | |
| 2012/0092995 | A1* | 4/2012 | Arvidsson | H04L 47/10 370/235 |
| 2012/0278477 | A1* | 11/2012 | Terrell | H04L 41/5009 709/224 |
| 2013/0003538 | A1* | 1/2013 | Greenberg | H04L 47/623 370/230 |
| 2013/0016610 | A1* | 1/2013 | Kutscher | H04L 47/10 370/230 |
| 2013/0077486 | A1 | 3/2013 | Keith | |
| 2013/0204965 | A1* | 8/2013 | Masputra | H04L 47/60 709/217 |
| 2014/0022900 | A1 | 1/2014 | Salot et al. | |
| 2014/0092736 | A1* | 4/2014 | Baillargeon | H04W 72/1226 370/230 |
| 2014/0105044 | A1 | 4/2014 | Baillargeon | |
| 2014/0105060 | A1 | 4/2014 | Baillargeon | |
| 2014/0164641 | A1* | 6/2014 | Ye | H04L 47/127 709/235 |
| 2014/0204754 | A1* | 7/2014 | Jeong | H04W 28/0231 370/235 |

FOREIGN PATENT DOCUMENTS

| | | | |
|---|---|---|---|
| JP | 2007526706 | A | 9/2007 |
| JP | 2011055546 | A | 3/2011 |
| JP | 2013132019 | A | 7/2013 |
| JP | 2013542629 | A | 11/2013 |
| WO | 2010140015 | A1 | 12/2010 |
| WO | 2012028972 | A1 | 3/2012 |
| WO | WO-2014005557 | A1 * | 1/2014 ......... H04L 47/2491 |

OTHER PUBLICATIONS

European Search Report for European Patent Application No. 14885858.2, dated Jan. 13, 2017, 3 pages.
Summary of Office Action for Japanese Patent Application No. 2016-540506, dated Nov. 13, 2017, 2 pages.
Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.0.0, 3GPP Organizational Partners, Sep. 2014, 308 pages.
Author Unknown, "Technical Specification Group Core Network and Terminals; General Packet Radio System (GPRS) Tunnelling Protocol User Plane (GTPv1-U) (Release 12)," Technical Specification 29.281, Version 12.0.0, 3GPP Organizational Partners, Sep. 2014, 27 pages.
Author Unknown, "Transmission Control Protocol," Darpa Internet Program, Protocol Specification, Request for Comments: 793, Chapter 3.3, Sep. 1981, Marina del Rey, California, Information Sciences Institute, 9 pages.
Briscoe, Bob, "Byte and Packet Congestion Notification draft-briscoe-tsvwg-byte-pkt-mark-02," Transport Area Working Group, Internet-Draft, Intended Status: Informational, Feb. 24, 2008, The IETF Trust, pp. 1-37.
Briscoe, Bob, Ed., et al., "Congestion Exposure (ConEx) Concepts and Use Cases," Internet Engineering Task Force (IETF), Request for Comments: 6789, Category: Informational, Dec. 2012, IETF Trust, pp. 1-17.
Calhoun, Pat R., et al., "Control and Provisioning of Wireless Access Points (CAPWAP) Protocol Specification," Network Working Group, Request for Comments: 5415, Category: Standards Track, Mar. 2009, IETF Trust, pp. 1-155.
Dommety, Gopal, "Key and Sequence Number Extensions to GRE," Network Working Group, Request for Comments: 2890, Category: Standards Track, Sep. 2000, The Internet Society, pp. 1-7.
Farinacci, Dino, et al., "Generic Routing Encapsulation (GRE)," Network Working Group, RFC: 2784, Category: Standards Track, Mar. 2000, The Internet Society, pp. 1-9.
Hamzeh, Kory, et al., "Point-to-Point Tunneling Protocol (PPTP)," Network Working Group, Request for Comments: 2637, Category: Informational, Jul. 1999, The Internet Society, pp. 1-57.
Kent, Stephen, et al., "Security Architecture for the Internet Protocol," Network Working Group, Request for Comments: 4301, Category: Standards Track, Dec. 2005, The Internet Society, pp. 1-101.
Krishnan, Suresh, et al., "IPv6 Destination Option for ConEx draft-ietf-conex-destopt-06," ConEx Working Group, Internet-Draft, Intended Status: Standards Track, Feb. 14, 2014, IETF Trust, pp. 1-8.
Mathis, Matt, et al., "TCP Selective Acknowledgment Options," Network Working Group, Request for Comments: 2018, Category: Standards Track, Oct. 1996, pp. 1-12.
Mills, David L., et al., "Network Time Protocol Version 4: Protocol and Algorithms Specification," Internet Engineering Task Force (IETF), RFC: 5905, Category: Standards Track, Jun. 2010, IETF Trust, pp. 1-110.
Ramakrishnan, K. K., et al., "The Addition of Explicit Congestion Notification (ECN) to IP," Network Working Group, Request for Comments: 3168, Category: Standards Track, Sep. 2001, The Internet Society, pp. 1-63.
Rexford, Jennifer, "Congestion Control," Advanced Computer Networks, Lesson 6 presentation material from Fall 2008, Princeton,

(56) References Cited

OTHER PUBLICATIONS

New Jersey, Princeton University, www.cs.princeton.edu/courses/archive/spring07/cos461/, 29 pages.
International Search Report and Written Opinion for International Patent Application No. PCT/SE2014/051399, dated Jun. 29, 2015, 21 pages.
International Preliminary Report on Patentability for International Patent Application No. PCT/SE2014/051399, completed on Feb. 26, 2016, 9 pages.
Author Unknown, "Technical Specification Group Services and System Aspects; General Packet Radio Service (GPRS) enhancements for Evolved Universal Terrestrial Radio Access Network (E-UTRAN) access (Release 10)," Technical Specification 23.401, Version 10.11.0, 3GPP Organizational Partners, Mar. 2014, 279 pages.
Author Unknown, "Technical Specification Group Services and System Aspects; General Packet Radio Service (GPRS) enhancements for Evolved Universal Terrestrial Radio Access Network (E-UTRAN) access (Release 10)," Technical Specification 23.401, Version 10.0.0, 3GPP Organizational Partners, Sep. 2010, 271 pages.
Examination Report for European Patent Application No. 14885858.2, dated Apr. 24, 2018, 9 pages.

* cited by examiner

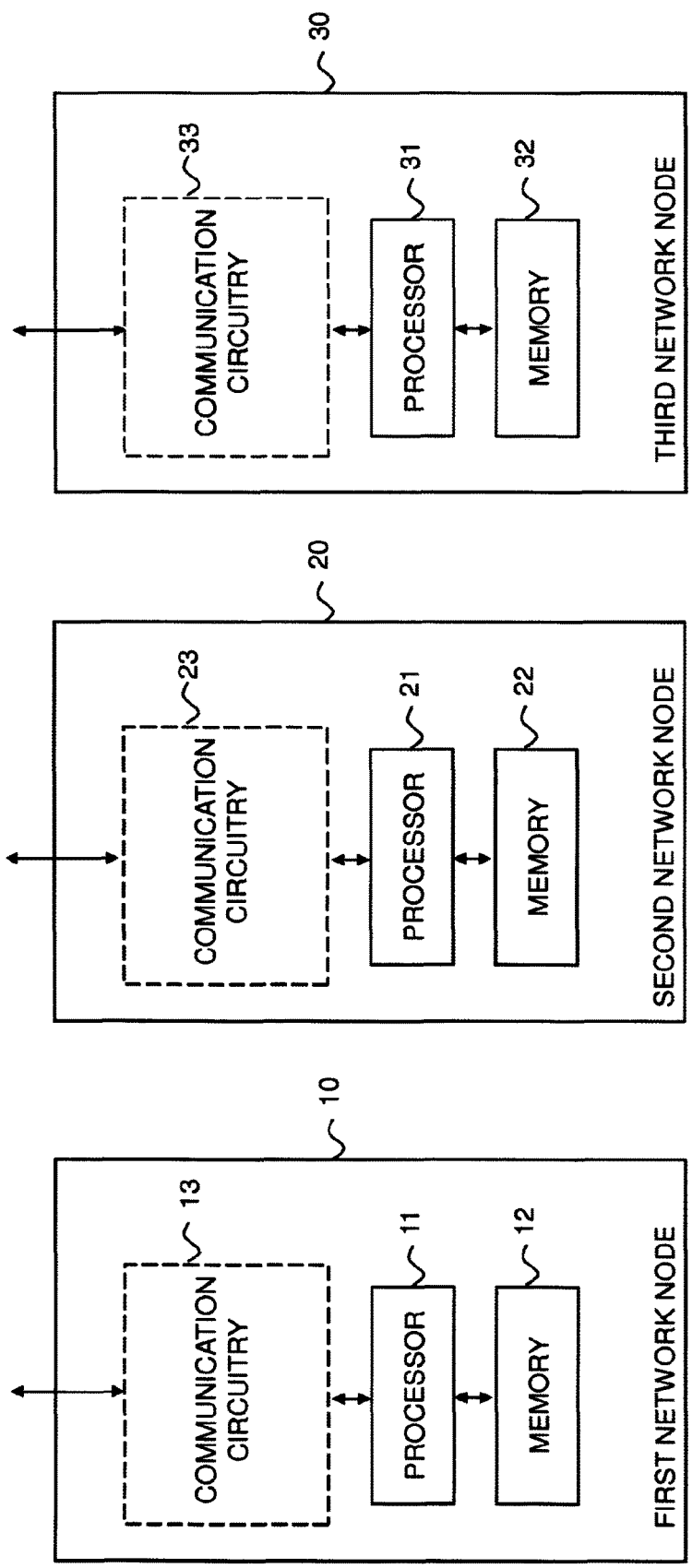

TUNNEL CONGESTION VOLUME POLICING

This application is a 35 U.S.C. § 371 national phase filing of International Application No. PCT/SE2014/051399, filed Nov. 24, 2014, which claims the benefit of U.S. Provisional Application No. 61/968,091, filed Mar. 20, 2014, the disclosures of which are incorporated herein by reference in their entireties.

TECHNICAL FIELD

The proposed technology generally relates to transport networks and more specifically to network congestion management.

BACKGROUND

Transport networks are limited resources and bandwidth usage is difficult to predict and manage. Network congestion may occur when more packets or data are transmitted through a network than the network can accommodate. The network typically has a fixed capacity, such as fixed bandwidth or a fixed packet transmission rate. Conventionally, networks experiencing such congestion may simply drop packets. However, dropping packets may have certain drawbacks, such as causing retransmission of the dropped packets, which may further contribute to or prolong the network congestion.

With the deployment of Wi-Fi and 4G radio access networks, the mobile transport network (aka backhaul network) is becoming the bandwidth bottleneck (BB) which is defined as the lowest bandwidth along the complete path between the mobile subscriber and the service endpoint (e.g. the Internet). The bottleneck bandwidth in mobile networks is often located at or near the last hop of the Long-Term Evolution (LTE) eNodeB (eNB) or Wi-Fi Access Point (AP).

Internet traffic is and will continue to be the bulk of the traffic carried over mobile networks. Such traffic is carried over default bearers know as non-Guaranteed Bit Rate (GBR) General Packet Radio Service (GPRS) Tunneling Protocol User (GTP-U) [Ref. 1] tunnels or Wi-Fi Control And Provisioning of Wireless Access Points (CAPWAP) [Ref. 2] or Generic Routing Encapsulation (GRE) [Ref. 3] tunnels usually with a low priority class. Wireless connectivity will soon surpass 300 Mbps, thus making possible for a single subscriber to consume a large portion or all of the transport network resources available between a radio access node and a mobile core network.

Today, when packet loss, delay, or average utilization exceeds a certain threshold, some mobile operators buy more capacity without necessarily attempting to manage the traffic. Other operators prefer to use rate enforcement and limit a number of heavy users at peak times, but they still eventually buy more capacity when utilization rises. In some cases, the backhaul capacity may be over-dimensioned generating a higher cost than necessary for transporting Internet traffic.

Current radio access technologies (Wi-Fi and 4G) do not dynamically account for the available capacity of the mobile transport network and do not know how the available backhaul capacity is shared among users. Thus, there is a general need of a more efficient procedure for managing the network capacity to avoid network congestion.

SUMMARY

It is an object to provide methods and radio network nodes for network congestion management in a wireless communication network.

This and other objects are met by embodiments of the proposed technology.

An aspect of the embodiments relates to a method performed by a first network node for enabling network congestion management in a wireless network. The method comprises the step of encapsulating and sending user packets in a tunnel to a second network node, wherein each user packet comprises information related to a byte loss volume for the tunnel. The method further comprises the step of receiving congestion volume information for the tunnel from the second network node. The method also comprises either the step of applying network congestion policing for the tunnel based on the received congestion volume information for the tunnel, or alternatively the step of forwarding the received congestion volume information for the tunnel to a third network node to enable network congestion policing for the tunnel based on the received congestion volume information for the tunnel.

Another aspect of the embodiments relates to a method performed by a second network node for enabling network congestion management in a wireless network. The method comprises the step of receiving encapsulated user packets in a tunnel from a first network node, wherein each received user packet comprises information related to a byte loss volume for the tunnel. The method further comprises the step of determining congestion volume information for the tunnel, based on the information related to a byte loss volume for the tunnel. The method also comprises the step of sending the determined congestion volume information for the tunnel to the first network node, to enable network congestion policing for the tunnel based on the determined congestion volume information for the tunnel.

Yet another aspect of the embodiments relates to a method performed by a third network node for managing network congestion in a wireless network. The method comprises the step of receiving congestion volume information for a tunnel from a first network node, wherein the received congestion volume information is determined by a second network node and forwarded by the first network node. The method further comprises the step of applying network congestion policing for the tunnel based on the received congestion volume information for the tunnel.

Yet another aspect of the embodiments relates to a first network node configured to enable network congestion management in a wireless network. The first network node is configured to encapsulate and send user packets in a tunnel to a second network node, wherein each user packet comprises information related to a byte loss volume for said tunnel. The first network node is further configured to receive congestion volume information for the tunnel from the second network node. The first network node is also configured to either apply network congestion policing for the tunnel based on the received congestion volume information for the tunnel, or alternatively to forward the received congestion volume information for the tunnel to a third network node to enable network congestion policing for the tunnel based on the received congestion volume information for the tunnel.

Yet another aspect of the embodiments relates to a first network node for enabling network congestion management in a wireless network. The first network node comprises an encapsulating/sending module for encapsulating user packets for sending in a tunnel to a second network node, wherein each user packet comprises information related to a byte loss volume for the tunnel. The first network node further comprises a receiving module for reading congestion volume information for the tunnel received from the second network node. The first network node may also comprise a policing module for applying network congestion policing for the tunnel based on the received congestion volume information for the tunnel, and/or a forwarding module for preparing the received congestion volume information for the tunnel for forwarding to a third network node, to enable network congestion policing for the tunnel based on the received congestion volume information for the tunnel.

Yet another aspect of the embodiments relates to a second network node configured to enable network congestion management in a wireless network. The second network node is configured to receive encapsulated user packets in a tunnel from a first network node, wherein each received user packet comprises information related to a byte loss volume for the tunnel. The second network node is further configured to determine congestion volume information for the tunnel based on the information related to a byte loss volume for the tunnel. The second network node is also configured to send the determined congestion volume information for the tunnel to the first network node, to enable network congestion policing for the tunnel based on the determined congestion volume information for the tunnel.

Yet another aspect of the embodiments relates to a second network node for enabling network congestion management in a wireless network. The second network node comprises a receiving module for reading encapsulated user packets received in a tunnel from a first network node, wherein each received user packet comprises information related to a byte loss volume for the tunnel. The second network node further comprises a determining module for determining congestion volume information for the tunnel based on the information related to a byte loss volume for the tunnel. The second network node also comprises a sending module for preparing the determined congestion volume information for the tunnel for sending to the first network node, to enable network congestion policing for the tunnel based on the determined congestion volume information for the tunnel.

Yet another aspect of the embodiments relates to a third network node configured to manage network congestion in a wireless network. The third network node is configured to receive congestion volume information for a tunnel from a first network node, wherein the received congestion volume information is determined by a second network node and forwarded by the first network node. The third network node is further configured to apply network congestion policing for the tunnel based on the received congestion volume information for the tunnel.

Yet another aspect of the embodiments relates to a third network node for managing network congestion in a wireless network. The third network node comprises a receiving module for reading congestion volume information for a tunnel, received from a first network node, wherein the received congestion volume information is determined by a second network node and forwarded by the first network node. The third network node further comprises a policing module for applying network congestion policing for the tunnel based on the received congestion volume information for the tunnel.

Yet another aspect of the embodiments relates to a computer program comprising instructions, which when executed by at least one processor, cause the processor or processors to encapsulate user packets for sending in a tunnel from a first network node to a second network node wherein each user packet comprises information related to a byte loss volume for said tunnel, to read congestion volume information for the tunnel received at the first network node, and either to apply network congestion policing for the tunnel based on the received congestion volume information for the tunnel, or alternatively to prepare the received congestion volume information for the tunnel for forwarding to a third network node to enable network congestion policing for the tunnel based on the received congestion volume information for the tunnel.

Yet another aspect of the embodiments relates to a computer program comprising instructions, which when executed by at least one processor, cause the processor or processors to read encapsulated user packets received at a second network node sent in a tunnel from a first network node wherein each received user packet comprises information related to a byte loss volume for the tunnel, to determine congestion volume information for the tunnel based on the information related to a byte loss volume for the tunnel, and to prepare the determined congestion volume information for the tunnel for sending from the second network node to the first network node, to enable network congestion policing for the tunnel based on the determined congestion volume information for the tunnel.

Yet another aspect of the embodiments relates to a computer program comprising instructions, which when executed by at least one processor, cause the processor or processors to read congestion volume information for a tunnel received from a first network node, wherein the received congestion volume information is determined by a second network node and forwarded by the first network node, and to apply network congestion policing for the tunnel based on the received congestion volume information for the tunnel.

Yet another aspect of the embodiments relates to a carrier comprising any of the above computer programs, wherein the carrier is one of an electronic signal, an optical signal, an electromagnetic signal, a magnetic signal, an electric signal, a radio signal, a microwave signal, or a computer-readable storage medium.

Some advantages of the proposed solution are:
Congestion management solution independent from UE terminals and Internet endpoints or other transport protocol (e.g. TCP) implementations.
Simple functions implemented on existing nodes without negatively impacting the performance of the mobile network.
Faster response to congestion with short feedback.
Consistent congestion volume policies controlled by mobile operator depending on the radio access technology and/or service mix.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 5a is a schematic diagram illustrating an example of a first network node configured to enable network congestion management in a wireless network according to an embodiment.

FIG. 5b is a schematic diagram illustrating an example of a second network node configured to enable network congestion management in a wireless network according to an embodiment.

FIG. 5c is a schematic diagram illustrating an example of a third network node configured to manage network congestion in a wireless network according to an embodiment.

DETAILED DESCRIPTION

Figure 1A:
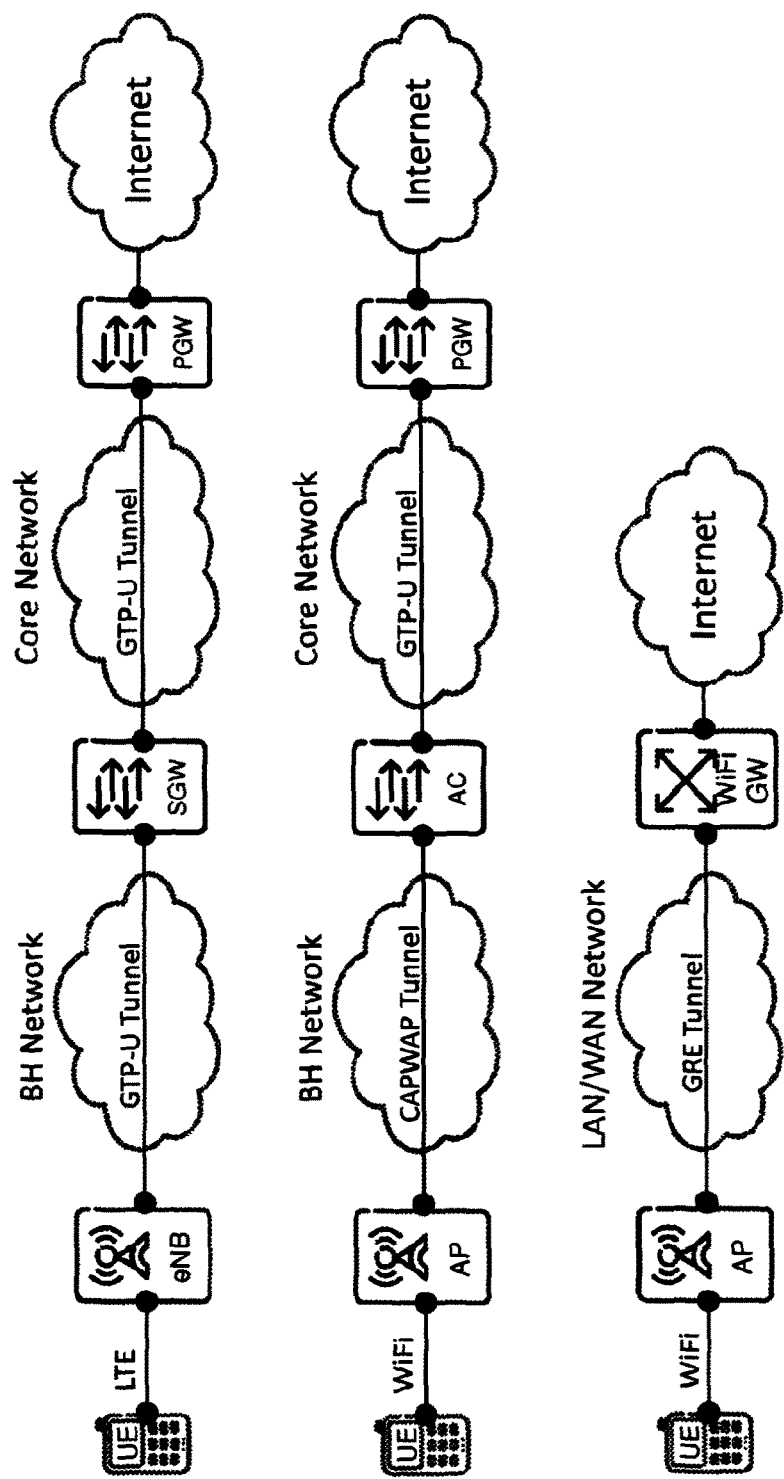
FIG. 1a is a schematic illustration of network nodes and connections in some wireless networks.

Throughout the drawings, the same reference numbers are used for similar or corresponding elements.

As described in the background section, current radio access technologies (Wi-Fi and 4G) do not dynamically account for the available capacity of the mobile transport network and do not know how the available backhaul capacity is shared among users. Thus, there is a general need of a more efficient procedure for managing the network capacity to avoid network congestion.

Traffic policing is the process of monitoring network traffic for compliance with a traffic contract and taking steps to enforce that contract. Traffic sources which are aware of a traffic contract may apply traffic shaping to ensure their output stays within the contract and is thus not discarded. Traffic exceeding a traffic contract may be discarded immediately, marked as non-compliant, or left as-is, depending on administrative policy and the characteristics of the excess traffic.

The recipient of traffic that has been policed will observe packet loss distributed throughout periods when incoming traffic exceeded the contract. If the source does not limit its sending rate (for example, through a feedback mechanism), this will continue, and may appear to the recipient as if link errors or some other disruption is causing random packet loss.

With reliable protocols, such as Transmission Control Protocol (TCP) as opposed to User Datagram Protocol (UDP), the dropped packets will not be acknowledged by the receiver, and therefore will be resent by the emitter, thus generating more traffic.

The received traffic, which has experienced policing en route, will typically comply with the contract, although jitter may be introduced by elements in the network downstream of the policer.

Sources with feedback-based congestion control mechanisms (for example TCP) typically adapt rapidly to static policing, converging on a rate just below the policed sustained rate.

$3^{rd}$ Generation Partnership Project (3GPP) has defined user data traffic bitrate enforcement [Ref. 4] or policing for individual User Equipment (UEs) and Access Point Names (APNs). For instance, in LTE networks, the UE Aggregate Maximum Bit Rate (AMBR) is a subscription parameter stored per UE in the Home Subscriber Server (HSS) that limits the aggregate bit rate that can be expected to be provided across all non-GBR bearers of a UE. The eNB in LTE networks is responsible for uplink (UL) and downlink (DL) rate enforcement based on UE-AMBR. The APN-AMBR is a second subscription parameter stored per APN in the HSS. It limits the aggregate bit rate that can be expected across all non-GBR bearers and across all Packet Data Network (PDN) connections of the same APN (e.g. the Internet APN). Each of those non-GBR bearers could potentially utilize the entire capacity allocated to the Internet APN, e.g. when the other subscribers do not carry any Internet traffic. The PDN Gateway (PGW) is responsible for UL and DL rate enforcement based on APN-AMBR. Rate enforcement or bitrate policing can also be configured on the PGW to limit each UE throughput for the default bearer for instance using a token bucket algorithm.

Problems with bitrate policing are for example:
It does not prevent congestion unless the policing rate is much lower than the bottleneck bandwidth defined as the lowest bandwidth along the complete path.
Mobile networks are becoming more heterogeneous where each outdoor or indoor cell site is deployed with different backhaul capacity.
It does not allow for optimal statistical multiplexing gain or utilization of the total available resources
Heavy users can still cause disproportionate congestion Internet Engineering Taskforce (IETF) defines congestion indication based on dropped packets or packets marked with Explicit Congestion Notification (ECN) markings [Ref. 5]. IETF has also defined congestion bitrate policing using Congestion Exposure (ConEx) [Ref. 6]. ConEx introduces congestion volume and congestion policer as follows:

Congestion volume: For any granularity of traffic (packet, flow, aggregate, link, etc.), the volume of bytes dropped or ECN-marked in a given period of time. Conceptually, data volume multiplied by the congestion each packet of the volume experienced. This is usually expressed in bytes (or kB, MB, etc.).
Congestion bitrate: The volume of lost or ECN Congestion Experienced (CE) marked bits per time unit. This is usually expressed in bits per second, bps (or kbps).
Congestion policer: A logical entity that allows a network operator to monitor each user's congestion-volume and enforce congestion volume limits.

Problems with ConEx are for example:
It excludes Internet Protocol version 4 (IPv4) and a large number of mobile networks still use IPv4.
It is currently only applicable to Transmission Control Protocol (TCP) traffic. The concept can be extended to other protocols but it generally requires modifications to the operating system (OS) networking stacks. As an example the BSD (Berkeley Software Distribution) style interface for User Datagram Protocol (UDP) sockets does not allow for inspection or modification in the Internet Protocol (IP) headers.
It requires changes to TCP senders to support ConEx Destination Option (CDO) [Ref. 7].
It recommends to use ECN [Ref. 5] but ECN deployment is limited in mobile backhaul networks because the benefits have not proved convincing enough to justify the investment. A further complication is that ECN suffers from a catch 22 problem in that it requires modification in both endpoints and in the network.
It recommends changes to TCP receivers [Ref. 8] [Ref. 5] for optimal ConEx performance.
It is too complex for initial deployment with too many operating modes and variances.
In many cases, LTE and possibly Wi-Fi traffic is protected in Internet Protocol (IP) security (IPsec) tunnel mode but ConEx compatibility with IPsec tunnel mode is questionable. IPsec does not copy any extension headers from the inner packet into outer headers, nor does IPsec construct the options in the outer header [Ref. 9]

US2012/0051216 A1 proposes a Localized Congestion Exposure [Ref. 10] in an invention that defines a simpler ConEx-like solution that runs on the GTP-U path between PGW and eNB. It assumes ECN is deployed and is working effectively in the backhaul network so that the eNB can feedback the downlink (DL) ECN markings to the PGW using uplink (UL) GTP-U performance reports.

To be effective, congestion bitrate policing must be done per flow or bearer using volume of bytes, not volume of packets since packet sizes may vary at any instance of time in any direction. The byte vs. packet issue is also discussed in the IETF [Ref. 11].

Figure 2:
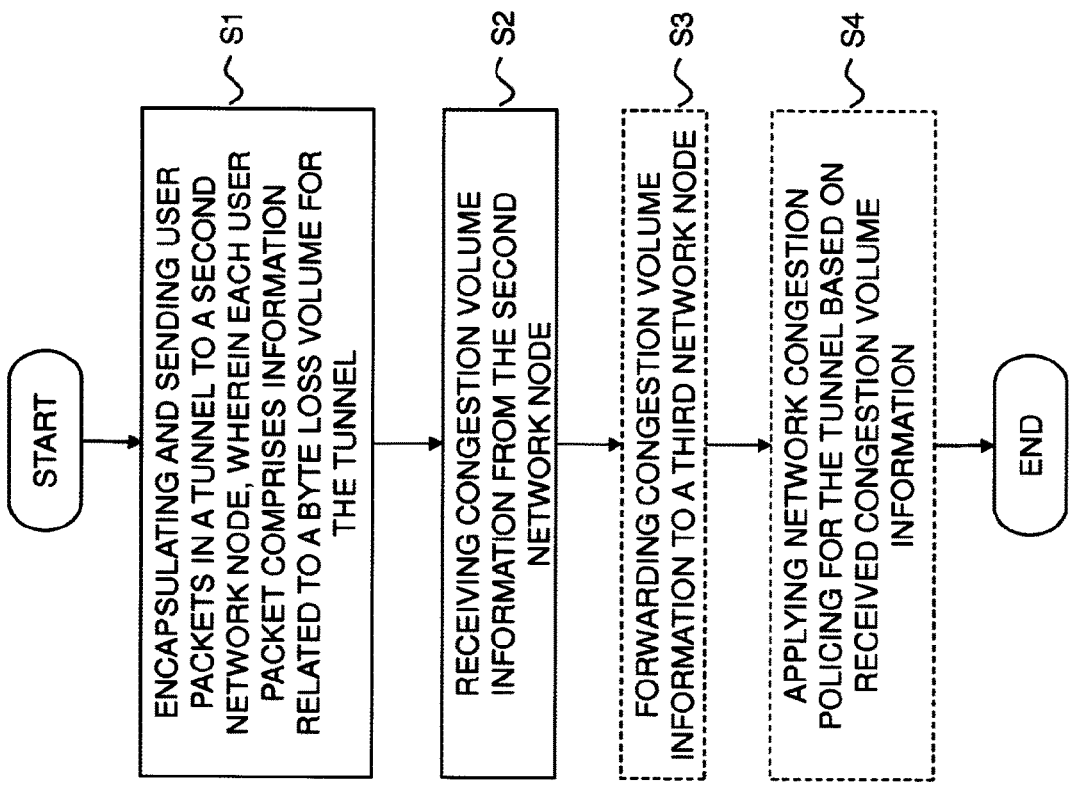
FIG. 2 is a schematic flow diagram illustrating an example of a method performed by a first network node for enabling network congestion management in a wireless network according to an embodiment.

FIG. 2 is a schematic flow diagram illustrating an example of a method performed by a first network node for enabling network congestion management in a wireless network according to an embodiment. The method comprises a step S1 of encapsulating and sending user packets in a tunnel to a second network node, wherein each user packet comprises information related to a byte loss volume for the tunnel. The method further comprises a step S2 of receiving congestion volume information for the tunnel from the second network node. The method also comprises either a step S4 of applying network congestion policing for the tunnel based on the received congestion volume information for the tunnel, or alternatively a step S3 of forwarding the received congestion volume information for the tunnel to a third network node, to enable network congestion policing for the tunnel based on the received congestion volume information for the tunnel. In other words, the first network node may either apply network congestion policing itself, or it may forward the congestion volume information to yet another network node, which in turn applies network congestion policing based on the congestion volume information. Thus, the first network node will do either step S3 or step S4 after step S2, not both step S3 and S4 at the same time. This is illustrated by the dashed lines in FIG. 2.

Of course, when the first network node sends the user packets, there is not yet any byte loss. It is the second network node that determines if byte loss has occurred, when receiving the user packets. As an example, the first network node may transmit a byte volume (without any loss), and the second network node may receive a byte volume and then determine the byte loss volume. So, the first network node does not send the actual byte loss volume; it sends information related to the byte loss volume, enabling the second network node to determine the actual byte loss volume.

In an example embodiment, the information related to a byte loss volume for the tunnel comprises a byte sequence number (BSN), which is defined as the first byte of data in each user packet for the tunnel. In a particular embodiment, the byte sequence number is provided in a tunnel header for the user packet.

In an alternative embodiment, the information related to a byte loss volume for the tunnel comprises a packet sequence number for the tunnel. In a particular embodiment, the packet sequence number is provided in a tunnel header for the user packet.

The network congestion policing can be implemented in many ways. One possibility is to base the policing on a drop probability for the user packets, i.e. the probability that an incoming user packet is dropped due to congestion. Thus, in a particular embodiment, the step S4 of applying network congestion policing for the tunnel is further based on a drop probability that a user packet destined to the second network node is discarded. In a particular embodiment, the drop probability is based on an exit timestamp, which is comprised in the received congestion volume information, and which is defined as the best possible approximate time of the departure of the congestion volume information from the second network node.

A more detailed description of network congestion policing methods can be found below.

Figure 3:
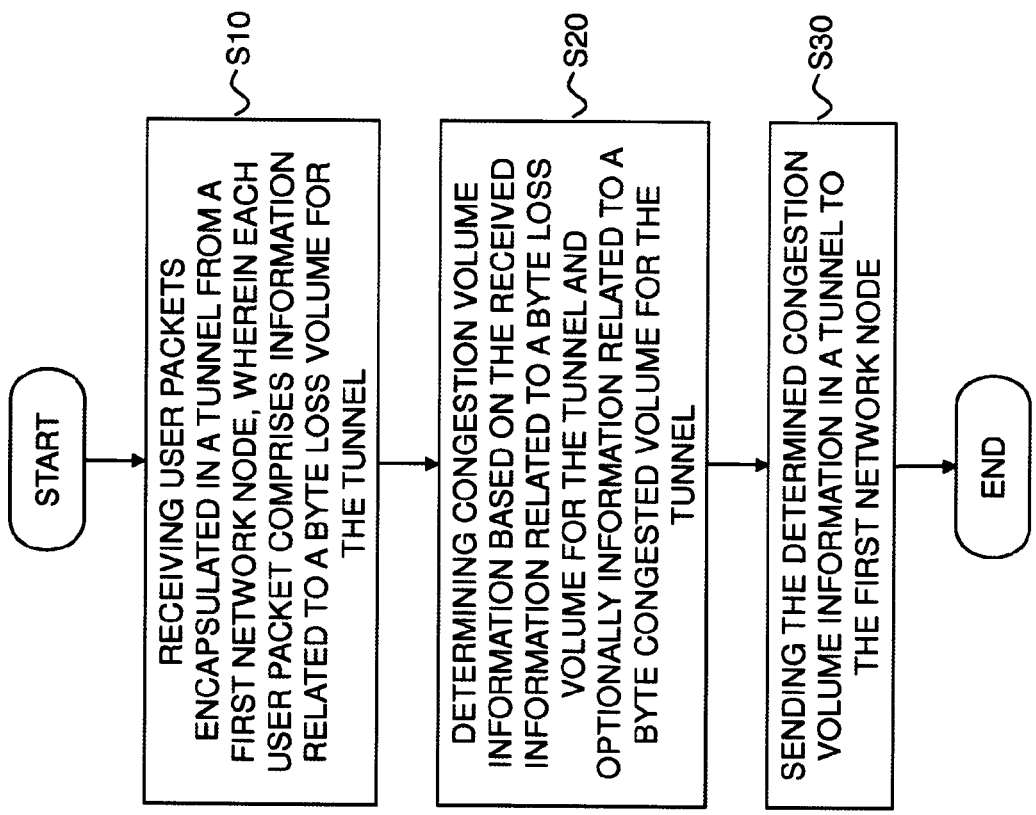
FIG. 3 is a schematic flow diagram illustrating an example of a method performed by a second network node for enabling network congestion management in a wireless network according to an embodiment.

FIG. 3 is a schematic flow diagram illustrating an example of a method performed by a second network node for enabling network congestion management in a wireless network. The method comprises the step S10 of receiving encapsulated user packets in a tunnel from a first network node, wherein each of the received user packets comprises information related to a byte loss volume for the tunnel. The method further comprises the step S20 of determining congestion volume information for the tunnel based on the information related to a byte loss volume for the tunnel. The method also comprises the step S30 of sending the determined congestion volume information for the tunnel to the first network node, to enable network congestion policing for the tunnel based on the determined congestion volume information for the tunnel.

As described above, the information related to a byte loss volume for the tunnel may in one embodiment comprise a byte sequence number for the tunnel. In such an embodiment, the byte loss volume for the tunnel may be detected when the received byte sequence number is larger than expected, i.e. larger than the byte sequence number of the preceding user packet plus the size of the user payload of the preceding user packet.

As described above, the information related to a byte loss volume for the tunnel may in one embodiment comprise a packet sequence number for the tunnel. In such an embodiment, the byte loss volume for the tunnel may be detected when the received packet sequence number is larger than expected, i.e. larger than the packet sequence number of the preceding user packet plus 1.

In one embodiment, the congestion volume information for the tunnel is also based on information related to a byte congested volume for the tunnel, where such information related to the byte congested volume for the tunnel may be comprised in the received user packets. In a particular embodiment, the information related to a byte congested volume for the tunnel comprises received user packets with Explicit Congestion Notification (ECN) markings provided in an IP header, indicating network congestion for the tunnel. In such an embodiment, the user packets sent from the first network node must of course comprise ECN markings indicating that the first network node is ECN-capable for the tunnel.

Figure 4:
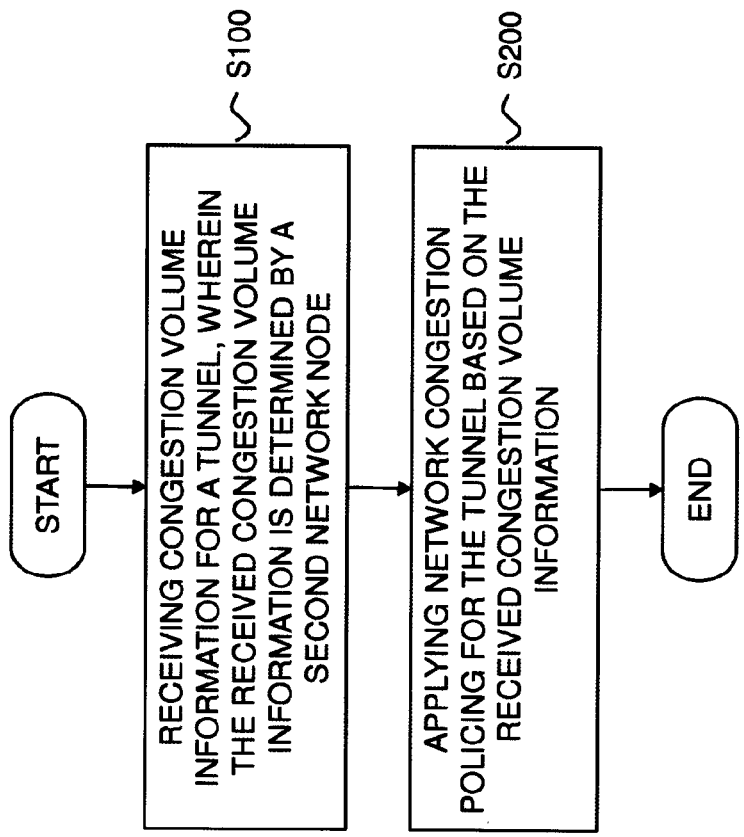
FIG. 4 is a schematic flow diagram illustrating an example of a method performed by a third network node for managing network congestion in a wireless network according to an embodiment.

FIG. 4 is a schematic flow diagram illustrating an example of a method performed by a third network node for managing network congestion in a wireless network. The method comprises the step S100 of receiving congestion volume information for a tunnel from a first network node, wherein the received congestion volume information is determined by a second network node and forwarded by the first network node. The method further comprises the step S200 of applying network congestion policing for the tunnel based on the received congestion volume information for the tunnel.

As described above, the network congestion policing can be implemented in many ways. One possibility is to base the policing on a drop probability for the user packets, i.e. the probability that an incoming user packet is dropped due to congestion. Thus, in a particular embodiment, the step S200 of applying network congestion policing for the tunnel is further based on a drop probability that a user packet destined to the first network node is discarded. In a particular embodiment, the drop probability is based on an exit timestamp, which is comprised in the received congestion volume information, and which is defined as the best possible approximate time of the departure of the congestion volume information from the second network node.

Figure 1B:
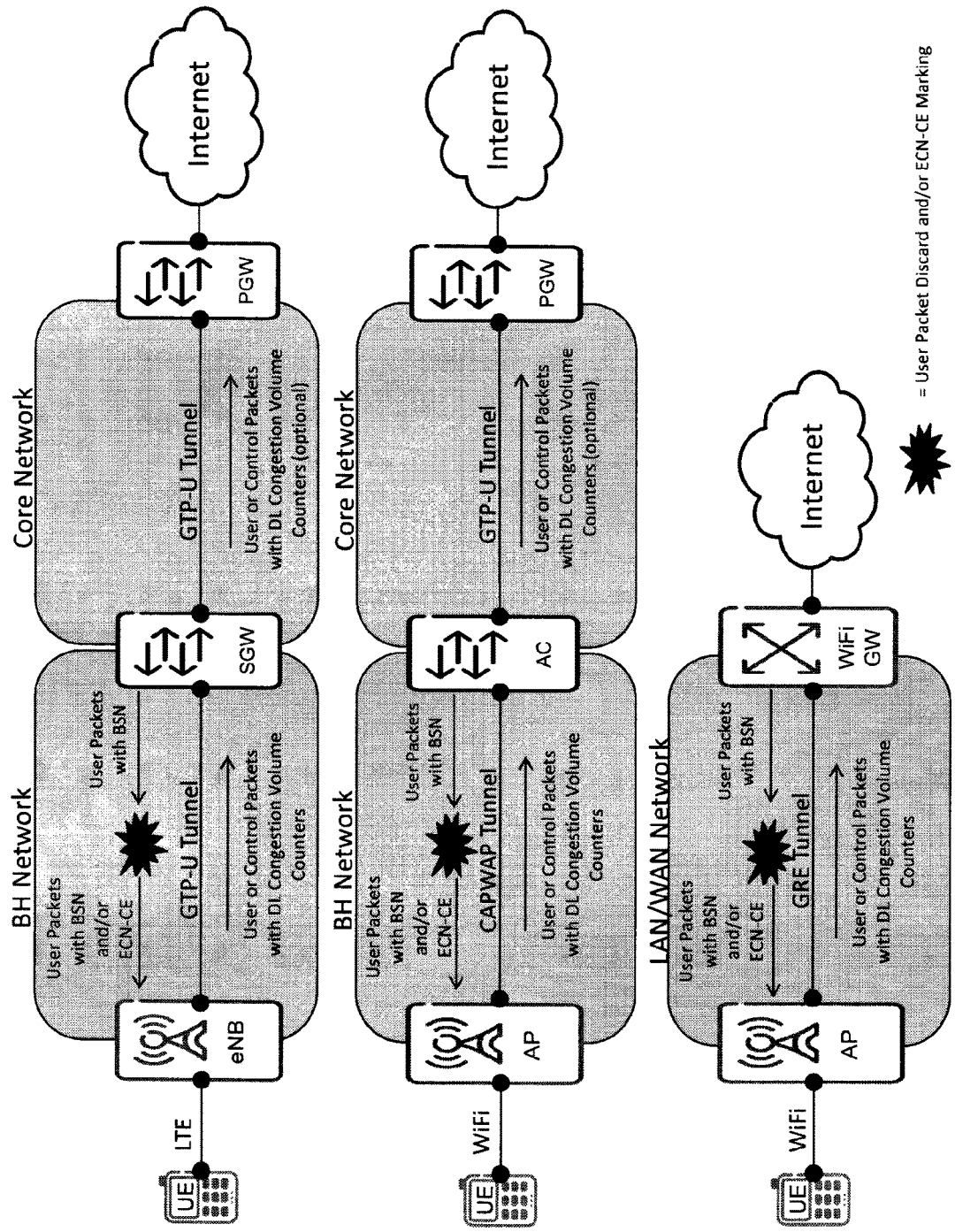
FIG. 1b is a schematic illustration of network nodes and connections in some wireless networks with the exchange of information related to tunnel congestion volume policing.
Figure 1C:
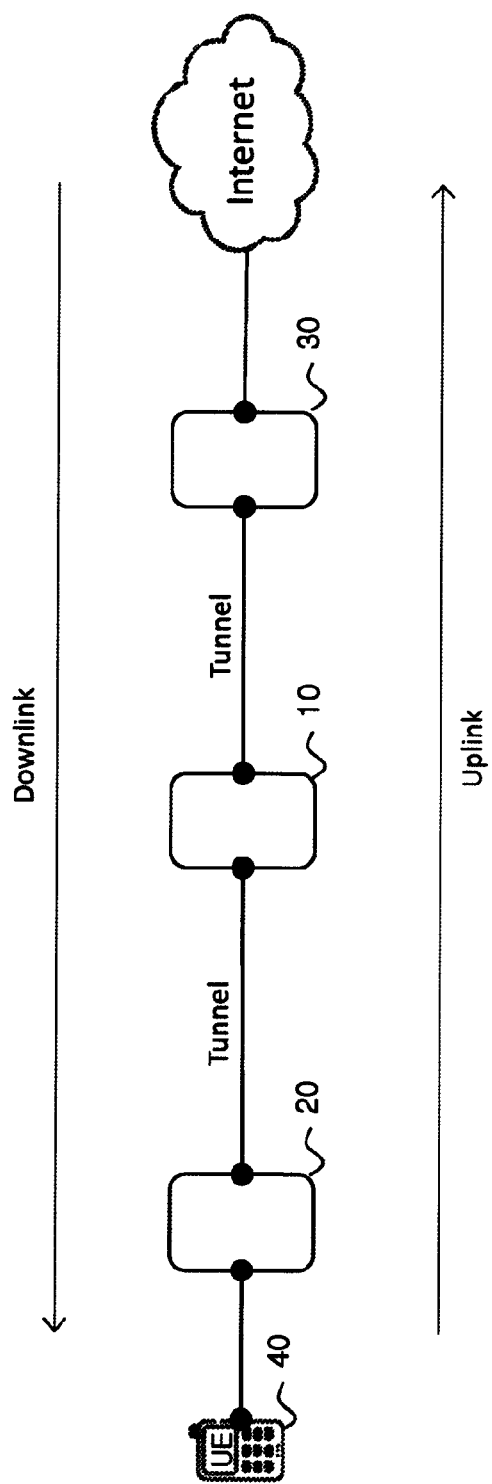
FIG. 1c is a schematic illustration of network nodes and connections in a wireless network according to an embodiment.

In an example implementation the network nodes are handling tunnels or connections for UEs, one (unidirectional) tunnel per transmission direction per UE or one (bidirectional) UE connection (bidirectional tunnel) per UE. In this case, the first, second and third network nodes act as either tunnel sender or tunnel receiver for a given tunnel in a given transmission direction. Furthermore, the first and second network nodes are tunnel peer nodes and the first and third network nodes are tunnel peer nodes. With reference to FIG. 1c, the basic diagram could be described as:

UE (40)—Second Network Node (20)—Tunnel—First Network Node (10)—Tunnel—Third Network Node (30)—Internet A path between two endpoints (nodes) has two directions: uplink and downlink. Congestion can in theory occur in either direction or in both directions at the "same time".

In an example implementation a network node is acting as a tunnel sender for a transmission direction to send byte sequence number (BSN) at the tunnel layer with the user data towards a peer node acting as a tunnel receiver. Then a peer node feeds back the byte-wise congestion volume to the tunnel sender at the tunnel layer with the user data traveling in the opposite direction or with dedicated signaling/control messages (without user data). Finally, congestion policing is performed at the network node acting as the tunnel sender.

In some example embodiments, the first network node 10 and the second network node 20 may be an Evolved Node B (eNodeB), a NodeB, an Access Point (AP), a Serving Gateway (SGW), a Radio Network Controller (RNC), an Access Controller (AC), a tunnel-capable router, or a virtualized network function (VNF). In some example embodiments, the third network may be a Packet Gateway (PGW), a Serving GPRS support node (SGSN), a Gateway GPRS support node (GGSN), a tunnel-capable router, or a virtualized network function (VNF) (see also FIG. 1a and 1b).

A key difference with regard to standard ConEX is that the present embodiments implement sending byte sequence number and returning congestion volume information between tunnel endpoints without involving the TCP endpoints.

In the following, some non-limiting examples of illustrative embodiments are described.

Method for Tracking Tunnel Congestion Volume

The currently proposed embodiments allow a tunnel receiver to monitor the volume of bytes that has been lost or dropped between the tunnel sender and receiver. The embodiments also allow a tunnel receiver to separately monitor the volume of bytes that has been marked with the ECN-CE codepoint between the tunnel sender and receiver using the same method. The sum of these two traffic volumes is known as the congestion volume. The operator may decide to monitor congestion volume in the downlink direction of a specific tunnel or specific UE. The operator may decide to monitor both directions at the same time or monitor UL direction as well. To simplify the text, it is assumed the bottleneck bandwidth is in the DL direction.

A tunnel sender is responsible to forward and encapsulate the user packet into a GTP-U, CAPWAP or GRE tunnel (or any other tunneling protocol). The tunnel receiver is responsible to receive the tunneled packet, de-capsulate the user packet and forward the user packet to the UE or forward the user packet to the next tunnel. In the DL direction of a LTE network, the tunnel sender and receiver across the S1-U interface are the SGW and eNB respectively. In the DL direction of a Wi-Fi network connected to a 3GPP mobile core network (EPC), the tunnel sender and receiver across the CAPWAP interface are the Access Controller and Access Point respectively. In the DL direction of a Wi-Fi network connected to the Internet (aka local breakout), the tunnel sender and receiver across the GRE interface are the Wi-Fi Gateway and Access Point respectively. See FIG. 1a and 1b.

The proposed solution defines a new field called the Byte Sequence Number (BSN) in the tunnel header that identifies the byte in the flow of data from the tunnel sender to the tunnel receiver. More specifically, it represents the first byte of data in each tunneled packet. The BSN is maintained as a variable by the tunnel sender for each UE bearer or UE connection that is policed for congestion.

The proposed solution also defines two counters incremented by the tunnel receiver. The pair of counters is applicable for each UE bearer or UE connection that is policed for congestion. The counters are:
LostOctetTotalCount
CeOctetTotalCount The LostOctetTotalCount is the total (cumulative) number of octets in input packets lost since the congestion monitoring process (re-) initialization for this connection. The number of octets includes all the data in the tunnel payload including the user Ethernet header and Q-tag (if applicable e.g. Wi-Fi) and user IP header and payload. In one embodiment it is suggested to allocate 32 bits to this counter.

The CeOctetTotalCount is the total (cumulative) number of octets in input packets marked with the Congestion Experienced (CE) marking (i.e. ECN codepoint=11) since the congestion monitoring process (re-)initialization for this connection. The number of octets includes all the data in the tunnel payload including the user Ethernet header and Q-tag if applicable and user IP header and payload. In one embodiment it is suggested to allocate 32 bits to this counter.

The tunnel receiver also implements a variable NextExpByte for each UE bearer or UE connection that is policed for congestion. The NextExpByte is the next expected byte sequence number in the data stream. Under normal conditions, the value of NextExpByte is the BSN plus the size of the user payload of the previous tunneled packet. A byte sequence discontinuity is detected when an input tunneled packet arrives with a larger byte sequence number than expected. The missing bytes are either lost or delayed (reordered). For simplification, it can be assumed that all bytes that trigger a sequence discontinuity are considered "lost" for congestion volume purposes. Alternatively, the tunnel receiver can maintain a small list of missing bytes and remove them from the LostOctetTotalCount or CeOctetTotalLost counter if they happen to arrive later within an acceptable timeframe.

For instance, when a tunneled packet is received, the tunnel receiver determines if packet loss and/or packet ECN-marking has occurred. If the received packet is marked with ECN-CE codepoint, the CeOctetTotalCount is incremented by the size of the user payload. If the received packet has triggered a byte sequence discontinuity, the LostOctetTotalCount counter is incremented by the BSN value from the received packet minus the NextExtByte value stored in the tunnel receiver memory.

Changes to GTP-U Protocol to Carry BSN

Figure 8:
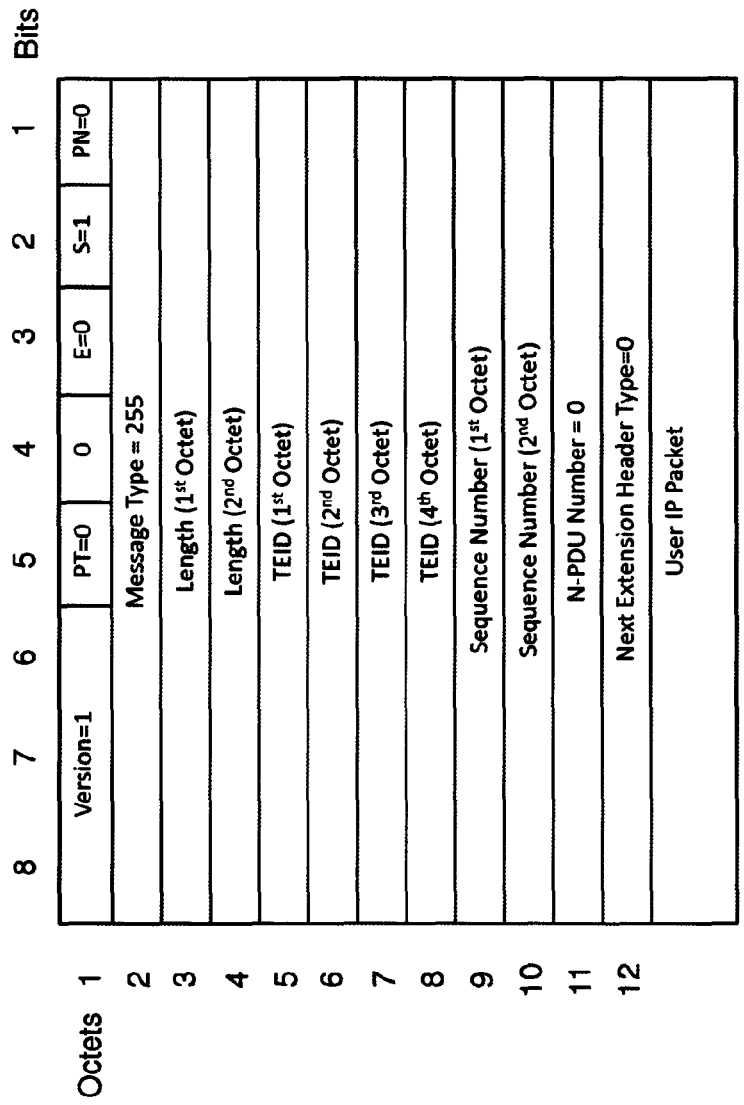
FIG. 8 shows the current GTP-U header according to prior art.

In the current 3GPP specifications, the GTP-U tunnel sender can maintain a separate sequence number for each GTP-U tunnel. Such sequence number is set to an initial value of zero upon the transmission of the first user packet encapsulated into GTP-U tunnel. It is incremented by 1 for each subsequent GTP-U packet transmission on the tunnel. The sequence number defined in the current 3GPP specification is intended to trigger the reordering of out of sequence packets at the remote peer when in-sequence delivery is required. FIG. 8 shows the current GTP-U header with the sequence number flag (S) set to 1. The Sequence Number (SN) field contains an unsigned 16 bit integer.

A new GTP-U header field called Byte Sequence Number (BSN) is proposed in an embodiment. It identifies the byte in the flow of data from the GTP-U tunnel sender to the GTP-U tunnel receiver. More specifically, it represents the first byte of data in the transmitted GTP-U packet for a specific UE bearer or Tunnel Endpoint Identifier (TEID). The GTP-U tunnel sender sets the sequence number to an initial value of 1 upon the transmission of the first packet into GTP-U tunnel. It is incremented by the number of bytes from the previously transmitted user packet payload (including IP header) for each subsequent GTP-U packet transmission on the tunnel. The new GTP-U sequence number does not include the GTP-U overhead and does not include the volume of bytes associated with GTP-U signaling messages.

Figure 9:
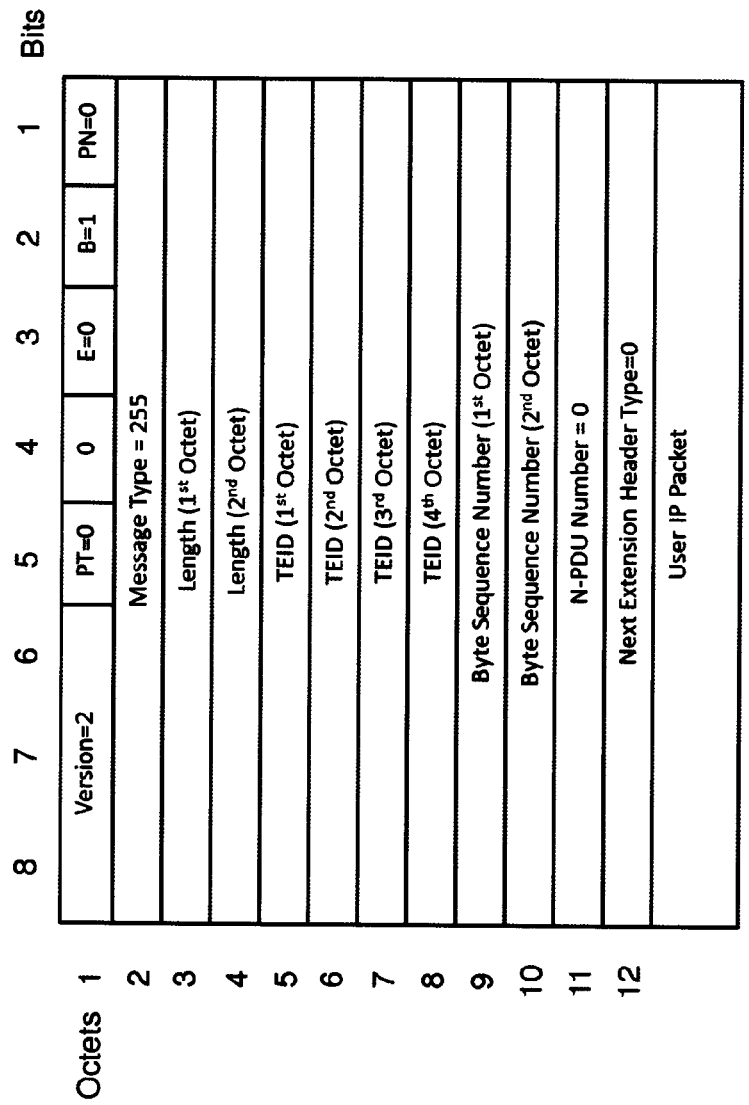
FIG. 9 shows a new GTP-U header to carry BSN information according to an embodiment.

The present solution proposes at least two ways to carry the BSN. Other options are possible. In a first embodiment the method is to keep the existing structure of the GTP-U header but define a new GTP-U version number that indicates that the previous SN field is now used for tracking the number of bytes as opposed to the number of packets. FIG. 9 shows the GTP-U header with the Version field set to 2, the B flag (replacing the S flag) set to 1 and the 16-bit BSN field.

Figure 10:
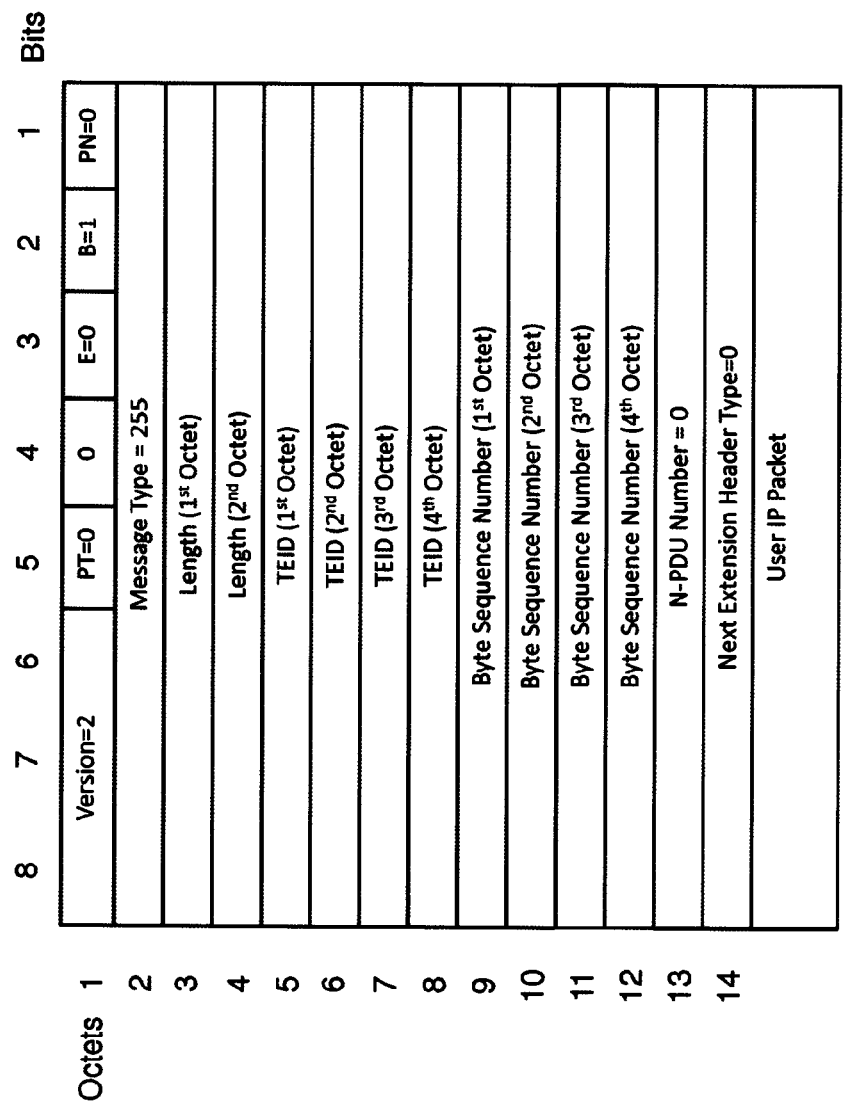
FIG. 10 shows a new GTP-U header to carry BSN information according to another embodiment.

In a second embodiment a longer 32 bit BSN field is proposed to handle the extreme cases when consecutive packet loss is significant and the sequence number could wrap around too quickly. FIG. 10 shows the GTP-U header with the Version field set to 2, the B flag set to 1 and the 32-bit BSN field.

Changes to CAPWAP Protocol to Carry BSN

Figure 11:
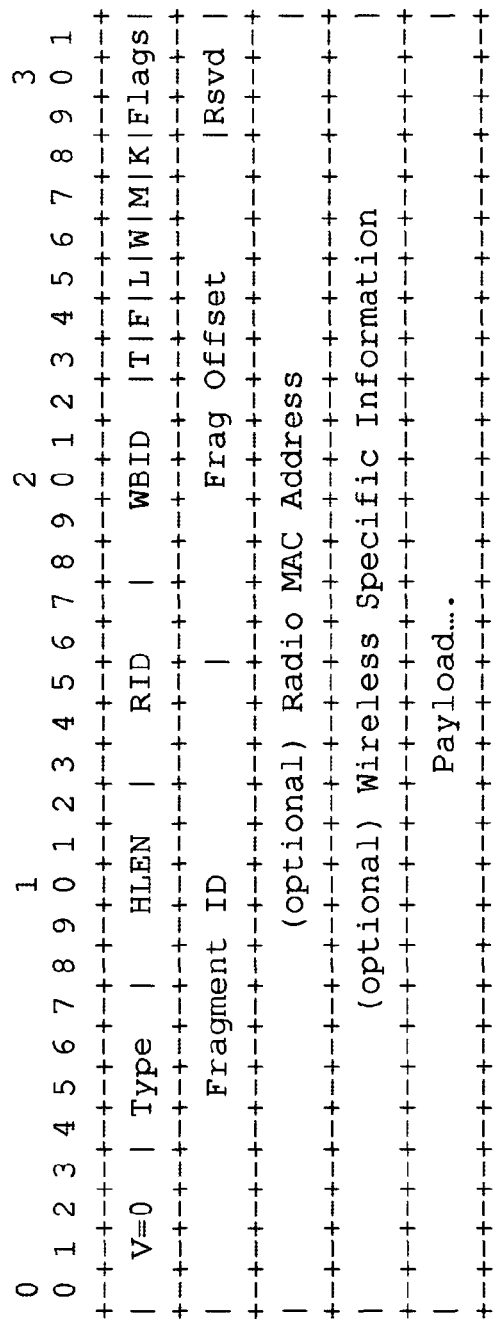
FIG. 11 shows the current CAPWAP header according to prior art.

In the current IETF specifications, the CAPWAP tunnel sender does not maintain a separate sequence number for each CAPWAP tunnel. FIG. 11 shows the current CAPWAP header with the version field set to zero.

Figure 12:
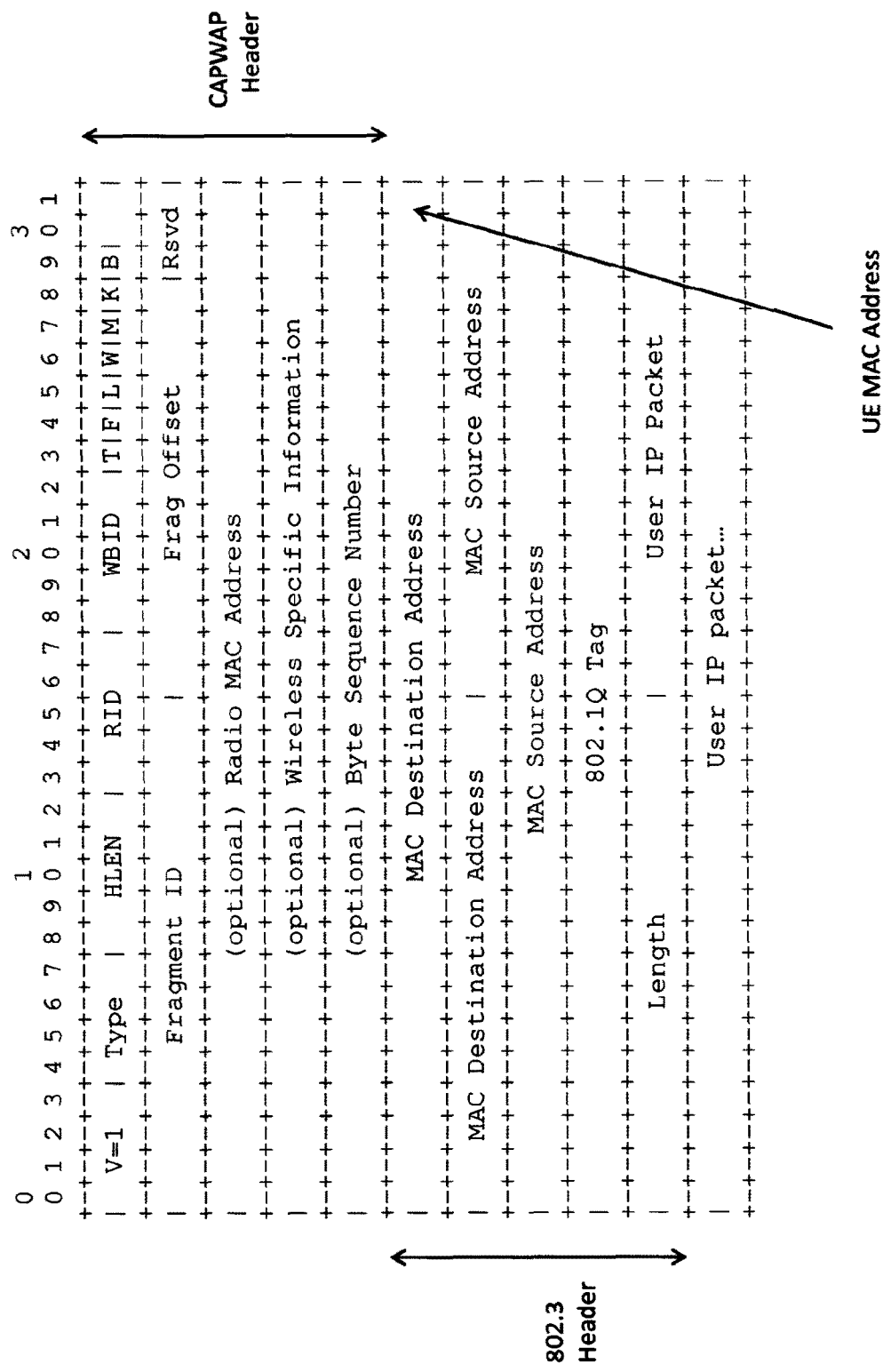
FIG. 12 shows a new CAPWAP header to carry BSN information according to an embodiment.

A new CAPWAP header field called Byte Sequence Number (BSN) is proposed in an embodiment. It identifies the byte in the data flow for a specific UE from the CAPWAP tunnel sender to the CAPWAP tunnel receiver. More specifically, it represents the first byte of data in the transmitted CAPWAP data packet for a specific UE connection (e.g. UE MAC address). The CAPWAP tunnel sender sets the sequence number to an initial value of 1 upon the transmission of the first packet towards the UE. It is incremented by the number of bytes from the previously transmitted user packet payload (including Ethernet and IP header) for each subsequent CAPWAP data packet transmission on the tunnel. The new CAPWAP sequence number does not include the CAPWAP overhead and does not include the volume of bytes associated with CAPWAP data channel keep-alive messages. FIG. 12 shows an example of a new CAPWAP header with the Version field set to 1, the new B flag set to 1 and the 32-bit BSN field according to an embodiment. Note that a Key field similar to the GRE header (see next section) can optionally be added to the new CAPWAP header to identify an individual UE connection within the tunnel.

Changes to GRE Protocol to Carry BSN

Figure 13:
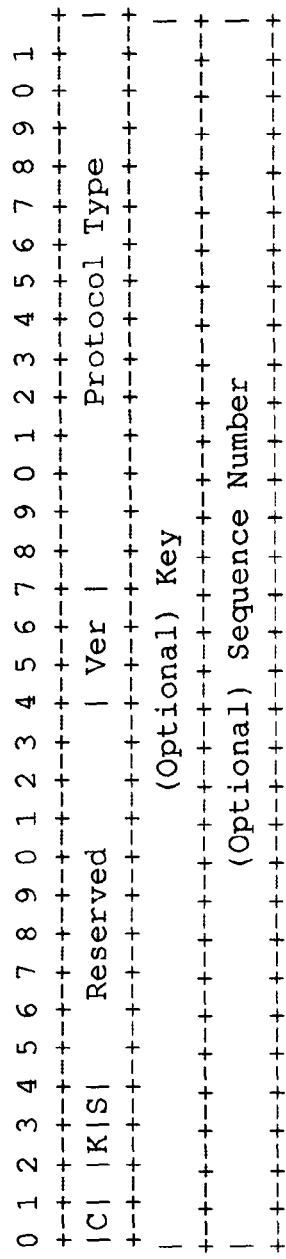
FIG. 13 shows the current GRE header according to prior art.

In the current IETF specifications, the GRE tunnel sender can maintain a separate key and sequence number for each GRE tunnel. Such fields are defined in RFC (Request For Comments) 2890 [Ref. 13]. Similar to the GTP-U Sequence Number, the GRE Sequence Number is optional and identifies the order GRE packets are transmitted. The Key field is optional and is intended to identify an individual traffic flow within the tunnel. For instance, it can be used to identify an individual UE connection between the AP and Wi-Fi Gateway (GW). Alternatively, the UE Media Access Control (MAC) address in the user data payload can be used to identify the UE connection. FIG. 13 shows the current GRE header with the optional Key and SN fields, Version field set to zero and Checksum Present bit set to zero (i.e. Checksum field is not present). GRE version 1 is used by Point-to-Point Tunneling Protocol (PPTP) [Ref. 12].

A new GRE header field called Byte Sequence Number (BSN) is proposed in an embodiment. It identifies the byte in the data flow for a specific UE from the GRE tunnel sender to the GRE tunnel receiver. More specifically, it represents the first byte of data in the transmitted GRE data packet for a specific UE MAC address.

Figure 14:
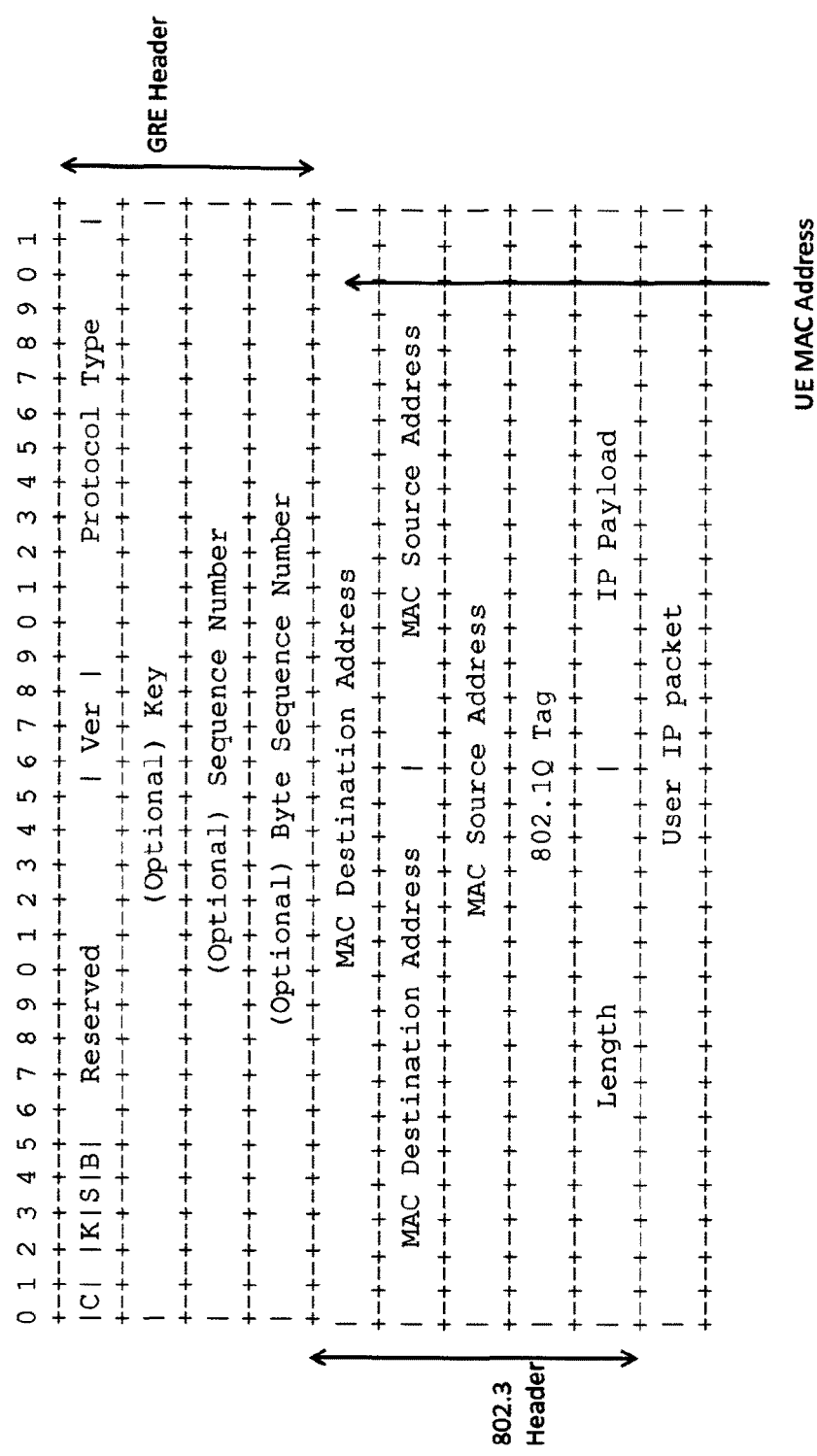
FIG. 14 shows a new GRE header to carry BSN information according to an embodiment.

The GRE tunnel sender sets the sequence number to an initial value of 1 upon the transmission of the first packet towards the UE. It is incremented by the number of bytes from the previously transmitted user packet payload (including Ethernet and IP header) for each subsequent GRE data packet transmission on the tunnel. The new GRE sequence number does not include the GRE overhead. FIG. 14 shows an example of a new GRE header with the new B flag indicating if the new 32-bit BSN field is present or not in the header according to an embodiment. The Version field can be set to zero and the new flag and BSN field can be recognized by defining a unique value for the Protocol Type. For instance, the value 0x8936 reserved by Ericsson A B can indicate it is a Congestion Volume GRE packet. Alternatively, the Version field can be set to 3.

Method for Reporting Tunnel Congestion Volume

The currently proposed embodiments allow a tunnel endpoint to report the congestion volume (LostOctetTotalCount and CeOctetTotalCount counters) to the tunnel peer (e.g. SGW, Wi-Fi Access Controller or Wi-Fi gateway) in real-time using new proposed extensions to GTP-U, CAPWAP and GRE tunneling protocols. Optionally an exit timestamp is also included.

The timestamp is inserted by the tunnel endpoint (eNB, AP) in an embodiment. It improves accuracy in the calculation of the congestion bitrate at the upstream tunnel node (e.g. SGW, Wi-Fi Access Controller, Wi-Fi gateway or PGW). The use of a timestamp field is motivated by the possibility that congestion reports may be delayed either in the network or by the sending entity, and may therefore make it less accurate to set the timestamp when the congestion reports arrive at the policer. In ideal cases where the backhaul delay for the congestion reports is constant and congestion reports are transmitted promptly, it should be sufficient to let the policer timestamp the congestion reports when they are received by the policer. Congestion reports may however experience a variant delay in the network due to network jitter. It is also possible that congestion reports are bundled to save both network overhead and signaling load. This unpredictable delay may not be large by still large enough to reduce the accuracy of a timestamp that is set when the reports arrive at the policer, and thus affect the accuracy of the Congestion Bit Rate (CBR) negatively.

The transmission of the congestion volume and associated timestamp may in an embodiment be done by involving the pair of tunnel sender and tunnel receiver working on the opposite direction of the UE bearer or connection.

The proposed solution proposes at least two ways to report the congestion volume information:
1) Piggybacking the counter values in tunneled user data packets traveling in the opposite direction for the UE bearer or connection.
2) Transmitting the counter values in separate control packets or user plane signaling messages.

The first method is preferred because it simplifies the implementation while reducing the overhead associated with congestion volume reporting. The embodiment defines a new header flag (and corresponding header field) and a new extension header for carrying the congestion volume counters in GTP-U, CAPWAP and GRE protocols.

With the first method, the congestion information is piggybacked and added to the next transmitted GTP-U packet going in the opposite direction to the upstream node only when necessary. If the congestion volume has not changed or has not increased significantly, the congestion volume information is not sent.

Changes to GTP-U Protocol to Carry BSN and Congestion Volume

The proposed solution defines a new GTP-U extension header in an embodiment. The general format of a GTP-U extension header is already defined in the GTPv1-U [Ref. 1]. It is used to carry additional data in the header of a G-PDU (GTP-U packet) or the header of a GTP-U signaling message. The new GTP-U extension header is called the Congestion Volume Indicator and it is assigned a unique 8-bit extension header value (e.g. 0xFFFF). The Congestion Volume Indicator is added to GTP-U packets (with GTP-U message type=255) traveling in the opposite direction for the UE bearer.

The Congestion Volume Indicator contains the following information elements:
Number of Bytes Lost in Reverse Direction (i.e. LostOctetTotalCount)
Number of Bytes with ECN-CE in Reverse Direction (i.e. CeOctetTotalCount)
Timestamp The timestamp is a 32 bit field according to RFC 5905 [Ref. 14] using the 32-bit NTP short format. (Note; a shorted 1-bit timestamp is sufficient but to keep it consistent with the implementation for other protocols, a 32 bit value is used here). The timestamp is the best possible approximation of the packet departure.

The Congestion Volume Indicator may in an embodiment also contain the following additional information in order to help the policing node to locate the corresponding tunnel:
Tunnel Endpoint Identifier data I
GTP-U Peer Address The Tunnel Endpoint Identifier data I is already defined in GTPv1-U [1]. In the case of the Congestion Volume Indication extension header, the Tunnel Endpoint Identifier data I is the TEID from the GTP-U tunnel that is being policed for congestion. For instance, if the congestion is downlink across the S1-U interface, it is the DL TEID.

The GTP-U Peer Address is already defined in GTPv1-U [1]. In the case of the Congestion Volume Indication extension header, the GTP-U Peer Address is destination IP address from the GTP-U tunnel being policed for congestion. For instance, if the congestion is downlink, if the congestion is downlink across the S1-U interface, it is the eNB IP address.

Figure 15:
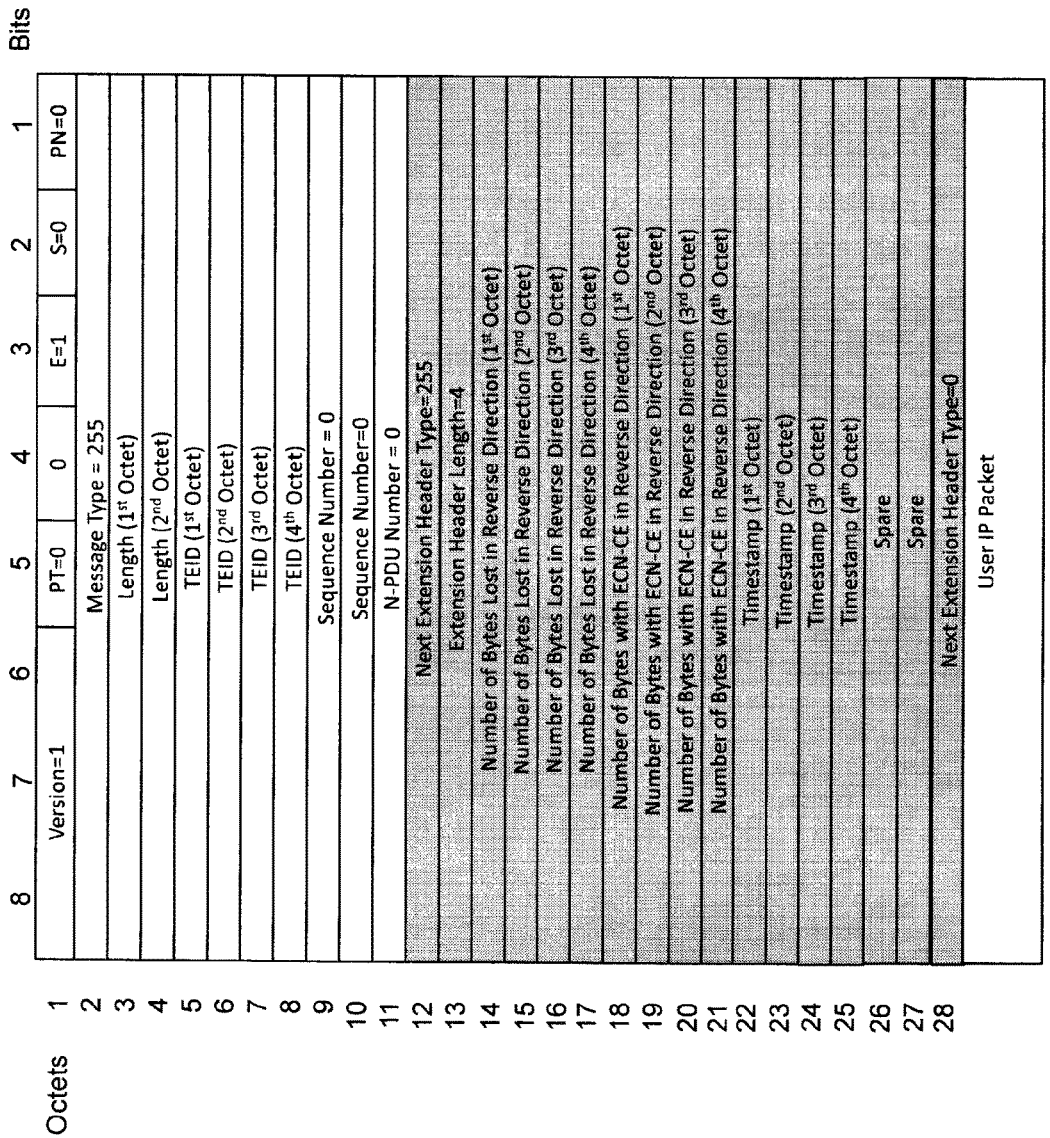
FIG. 15 shows a complete GTP-U header to carry both BSN and congestion volume information according to an embodiment.

FIG. 15 shows the complete GTP-U header with the Congestion Volume Indication extension header highlighted in grey according to an embodiment. It assumes the Tunnel Endpoint Identifier data I and GTP-U Peer Address are not needed.

It is important to note that each unicast GTP-U bearer is made of two tunnels: one DL tunnel with its DL tunnel sender and receiver pair and one UL tunnel with its UL tunnel sender and receiver pair. Therefore, when the DL tunnel receiver on a given node needs to report congestion volume to the upstream node, it is the corresponding UL tunnel sender on the same node that is responsible to transmit the congestion volume information traveling in the opposite direction of the congestion. Each DL tunnel receiver is associated with an UL tunnel sender and each DL tunnel sender is associated with an UL tunnel receiver.

Changes to CAPWAP Protocol to Carry BSN and Congestion Volume

In an embodiment the proposed solution adds two additional flags and corresponding fields to the CAPWAP Version 1 defined earlier. The additional flag bits are:

V bit (V meaning volume)
C bit (C meaning clock)

If the V bit is set to 1, then it indicates that both Number of Bytes Lost in Reverse Direction field and Number of Bytes with ECN-CE in Reverse Direction field are present. Separate flag bits can also be defined in the header in an embodiment.

If the C bit is set to 1, then it indicates that the Timestamp field is present.

Figure 16:
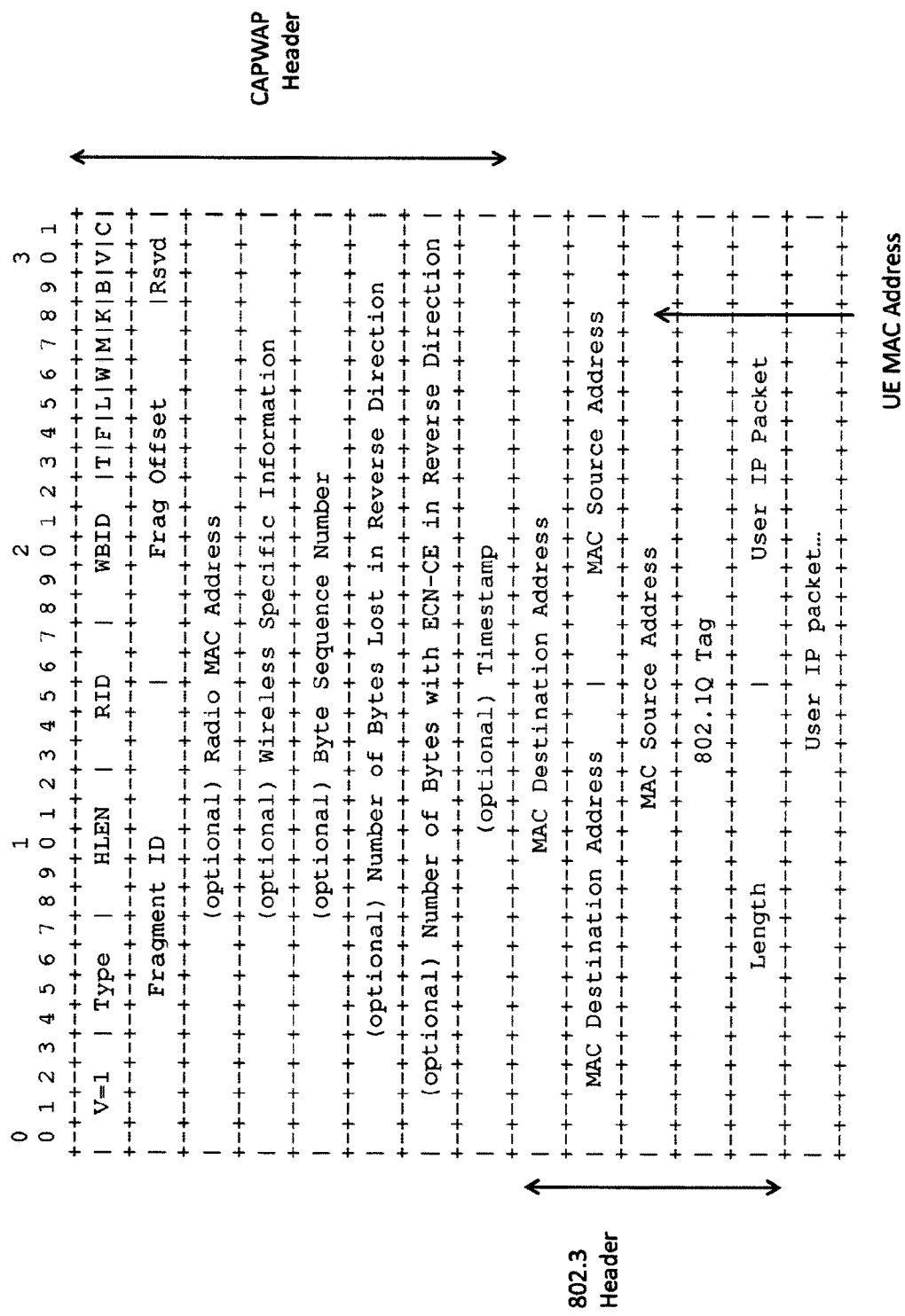
FIG. 16 shows a new CAPWAP header to carry both BSN and congestion volume information according to an embodiment.

FIG. 16 shows the CAPWAP header with the Version field set to 1 with the new flags and fields to report congestion volume in the opposite direction for a UE connection according to an embodiment.

Changes to GRE Protocol to Carry BSN and Congestion Volume

The proposed solution adds two additional flags to the GRE header in an embodiment. The additional flag bits are:

V bit (V meaning volume)
C bit (C meaning clock)

If the V bit is set to 1, then it indicates that both Number of Bytes Lost in Reverse Direction field and Number of Bytes with ECN-CE in Reverse Direction field are present. Separate flag bits can also be defined in the header in an embodiment.

If the C bit is set to 1, then it indicates that the Timestamp field is present.

Figure 17:
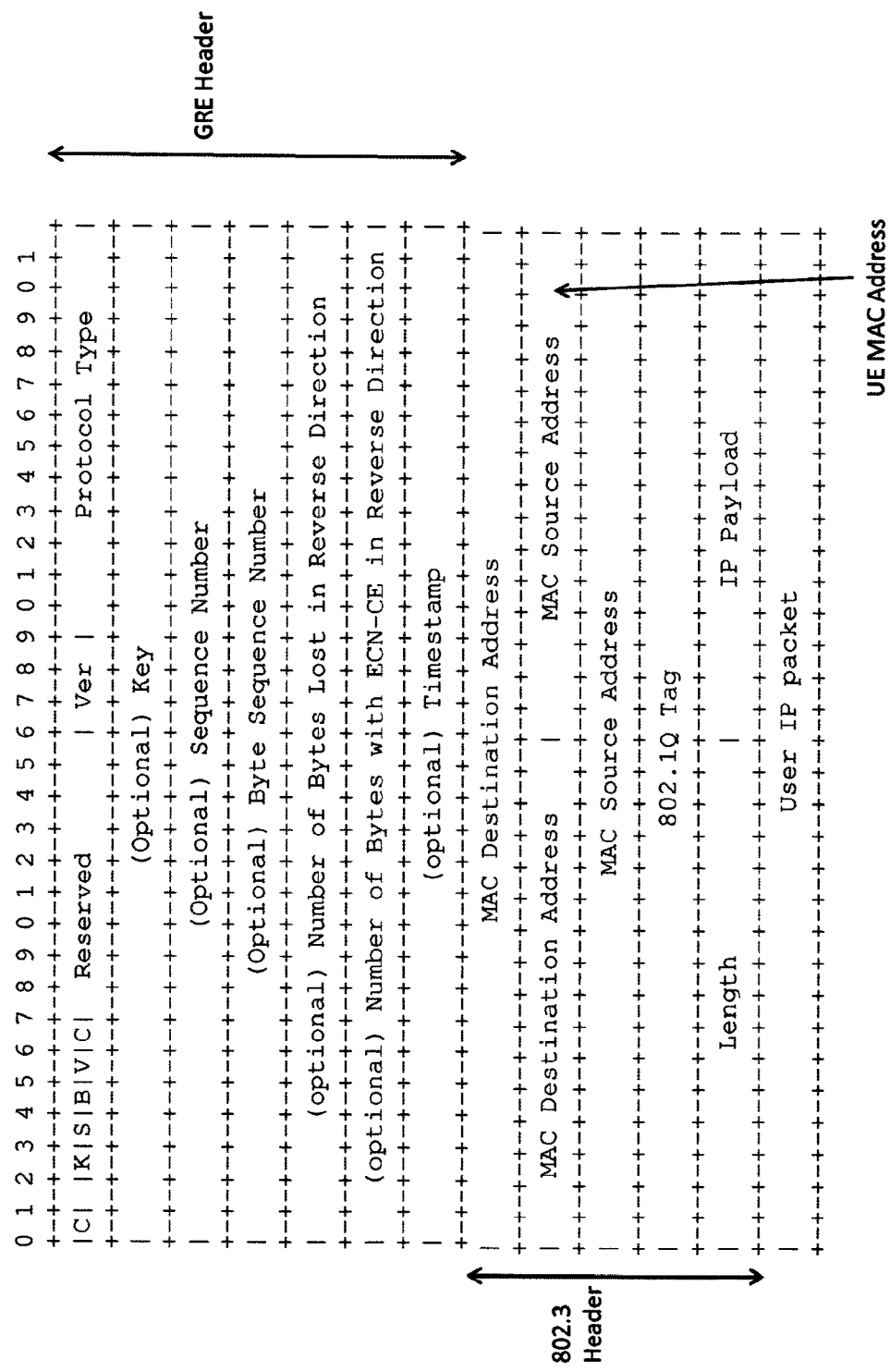
FIG. 17 shows a new GRE header to carry both BSN and congestion volume information according to an embodiment.

FIG. 17 shows the GRE header with the new flags and fields to report congestion volume in the opposite direction for a UE connection according to an embodiment. The Version field can be set to zero and the new flags and congestion volume fields can be recognized by defining a unique value for the Protocol Type. For instance, the value 0×8936 reserved by Ericsson A B can indicate it is a Congestion Volume GRE packet. Alternatively, the Version field can be set to 3 in an embodiment.

Method for Policing Tunnel Congestion Volume

The congestion reports are used by a policer, located in e.g. PGW, SGW, Access Controller (AC) or a Wi-Fi GW, according to the description below. See FIGS. 1a and 1b. The report interval depends mainly on the capability of the policer to receive the reports. In one embodiment, reports are transmitted at regular intervals given by a system defined parameter. In another embodiment, reports are only transmitted when lost or ECN marked packets are detected i.e. when the amount of lost or ECN-marked bytes are increased. A variation to the second embodiment is to introduce a threshold that defines how much the amount of lost and/or ECN-CE marked bytes should increase and become significant to warrant the transmission of a report. This can be combined with a timer that expires in which case a report is transmitted even though the threshold is not reached. This variation allows for reports for many bearers to be combined, to save signaling overhead.

One policer is implemented per UE bearer or UE connection. The main feature of the policer is to drop packets associated with UE bearers and connections that cause congestion. However, UE bearers and connections that are below their congestion allowance, here depicted as Aggregate Maximum Congestion bitrate (AMCR), will not experience any additional packet drops. Bearers and connections that exceed AMCR will however experience additional packet drops in the policer. This can both ensure fairness between users and also give protection against overload in the backhaul network.

Figure 18:
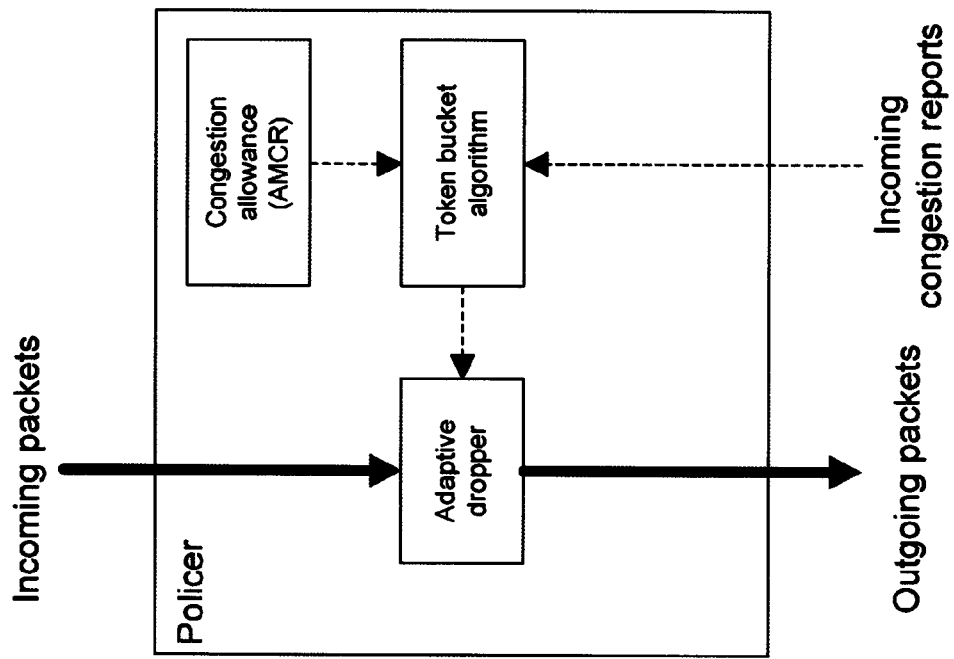
FIG. 18 shows a policer according to an embodiment.

The policing can be implemented in many ways. In one embodiment a token bucket is used, this is shown in FIG. 18. Two buckets are implemented, one that handles reports on lost bytes and one that handles ECN-CE marked bytes. Each bucket is filled at regular time intervals at a rate equal to the congestion allowance AMCR. The bucket level is decreased when a congestion report is received, the decrease is equal to the increment in congested bytes (LostOctetTotalCount or CeOctetTotalCount). Packets are dropped if the any of the two buckets becomes empty. A maximum bucket depth is typically implemented to avoid that congestion allowance is stored too long.

Figure 19:
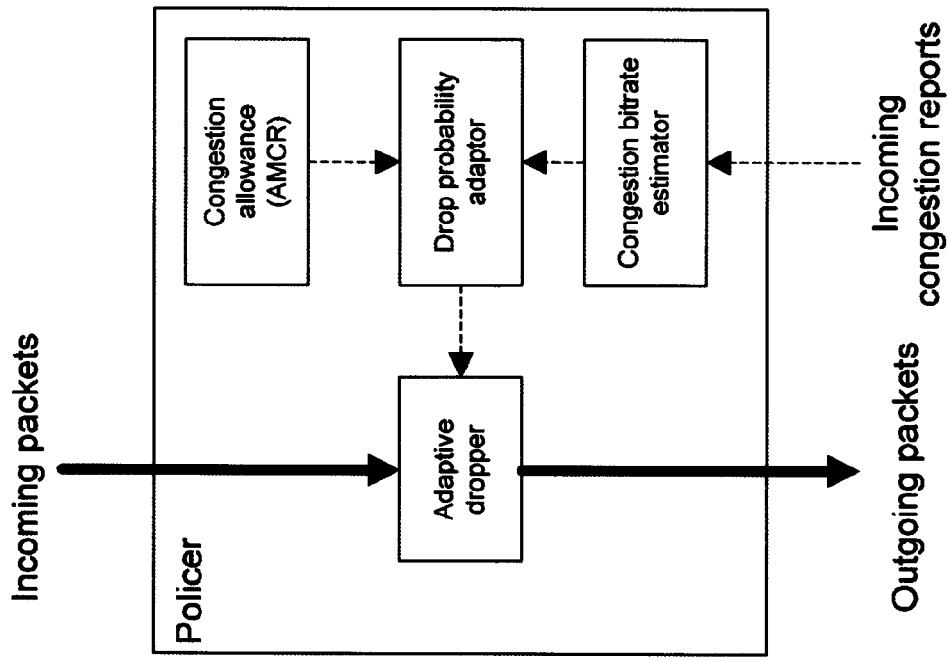
FIG. 19 shows a policer according to another embodiment.

Another alternative embodiment is to compute a drop probability based on the computed CBR and its relation to the congestion allowance given by AMCR. The CBR is computed as the number of lost or ECN-CE marked bits per second. The high level functionality of this alternative is shown in FIG. 19. The congestion reports are processed by a congestion bitrate estimator that computes $CBR_{Lost}$, which is the CBR due to lost packets given by LostOctetTotalCount, and $CBR_{Ce}$, which is the CBR due to ECN-CE marked packets given by CeOctetTotalCount. CBR is expressed in the unit bits per second (bps). Lost packets and ECN marked packets are handled separately to make the concept future proof, taking into account that ECN deployments may ECN-CE mark packets with a higher density than the intensity at which AQM may drop packets. For this reason, two separate AMCR values are maintained, namely $AMCR_{Lost}$ and $AMCR_{Ce}$.

The congestion bitrate values are used by a drop probability adaptor which increases or decreases the probability that incoming packets are dropped. Two packet drop probability (Pdrop) values are computed, one that is dependent on $CBR_{Lost}$ and one that is dependent on $CBR_{Ce}$.

The computation of CBR as well as the adjustment of Pdrop depends on factors such as the report interval and the desired response time of the congestion policing. For instance a fast changing Pdrop makes the policer react more quickly to e.g. malicious flows, the drawback can however be an increased risk of instability, which can manifest itself for instance in a link utilization that oscillates.

Figure 20:
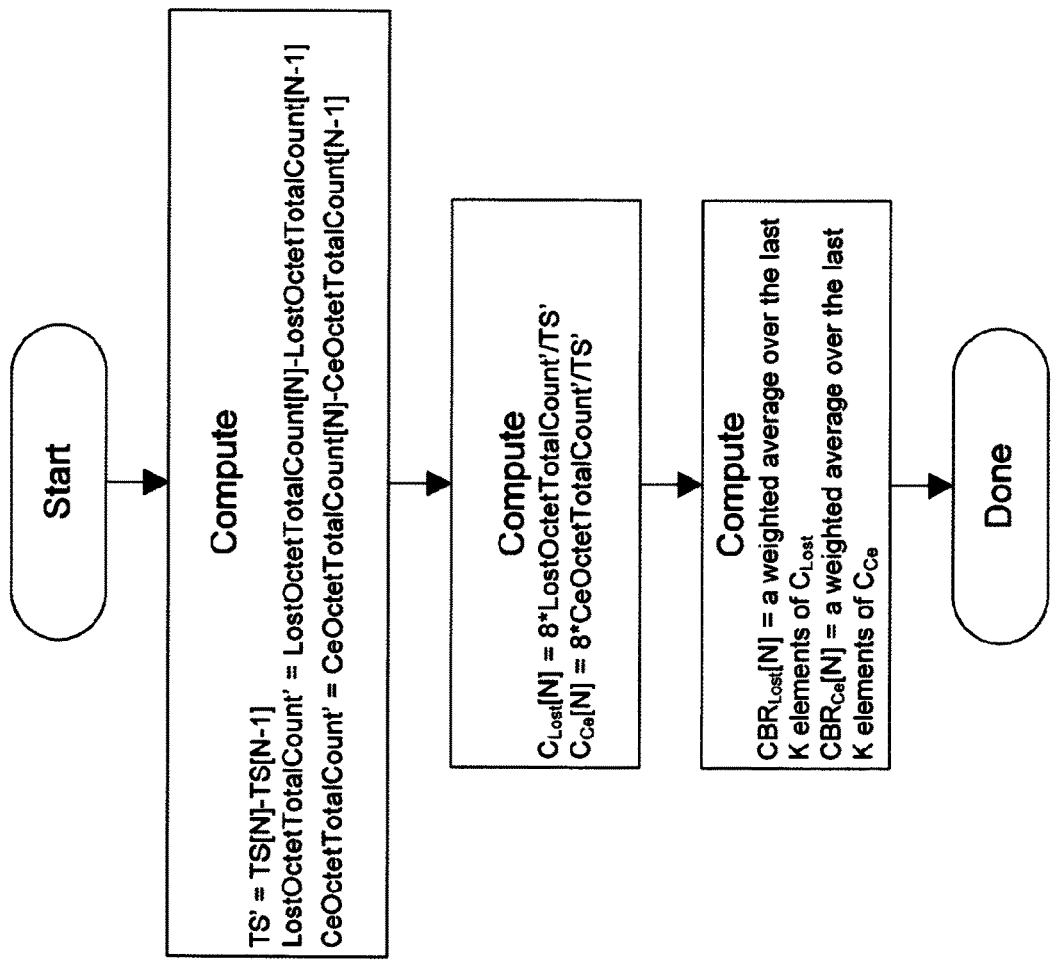
FIG. 20 shows a flowchart for a congestion bitrate estimator according to an embodiment.

A flowchart for an embodiment of a congestion bitrate estimator is shown in FIG. 20. The flow in this chart described how the congestion bitrate $CBR_{Lost}$ and $CBR_{Ce}$ is computed for each received congestion report, based on the relative increment of the values TS (Timestamp), LostOctetTotalCount and CeOctetTotalCount. The flow is executed for each new received congestion report. Each report contains the elements TS, LostOctetTotalCount and CeOctetTotalCount. [N] depicts the last received congestion report, [N-1] depicts the next last congestion report and so on. If the (exit) timestamp is available in the congestion reports, this value is used, otherwise a (arrival) timestamp value is determined based on when the congestion report arrives at the policer. As mentioned earlier the latter alternative may be less accurate if congestion reports are delayed in the network or by the sending entity for one reason or the other.

The final $CBR_{Lost}$ and $CBR_{Ce}$ values are computed as a weighted average over the last K received congestion reports. The weights as well as the value K depends on factors such as the interval between the congestion reports.

Figure 21:
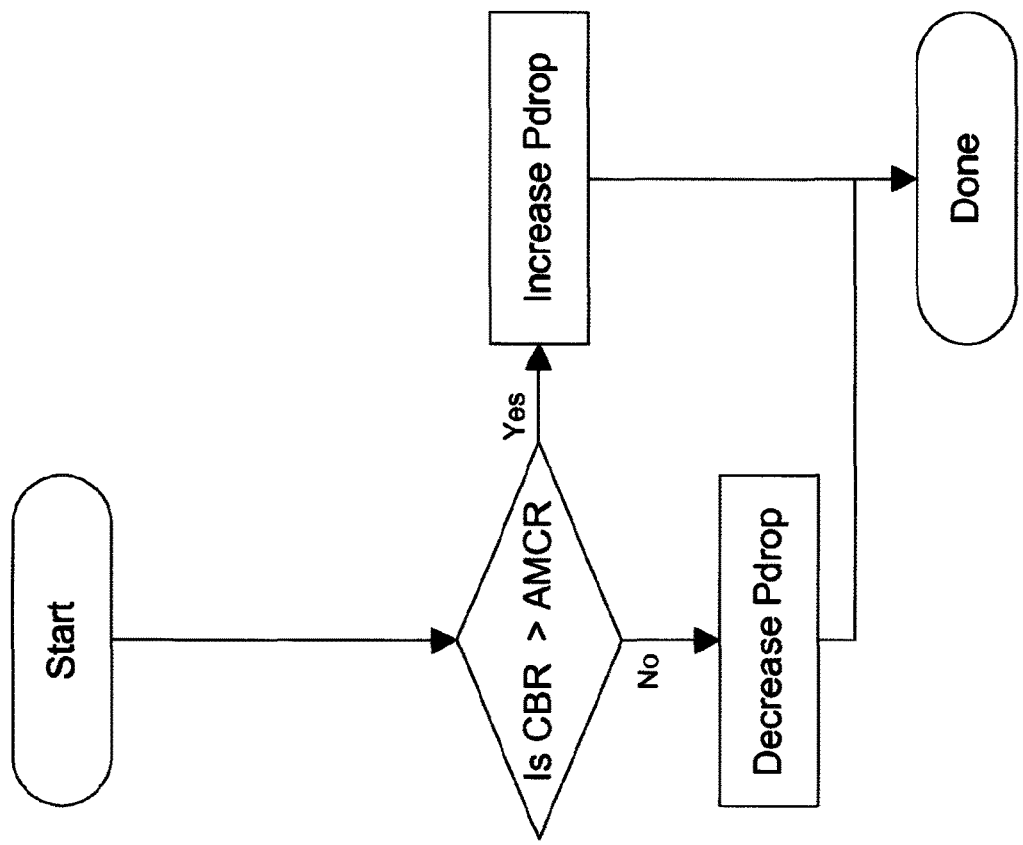
FIG. 21 shows a flow chart for computing the Pdrop value according to an embodiment.

The method to compute Pdrop can vary. FIG. 21 shows an example of a simple method which adjusts the Pdrop value depending on the relation between CBR and AMCR. The flow described in this chart is executed at regular instants given by a timer. Reports of lost packets and ECN-CE marked packets are treated separately, which means that two different values for Pdrop are computed. $Pdrop_{Lost}$ is computed based on packets lost and $Pdrop_{Ce}$ is computed based on ECN-CE marked packets.

Figure 22:
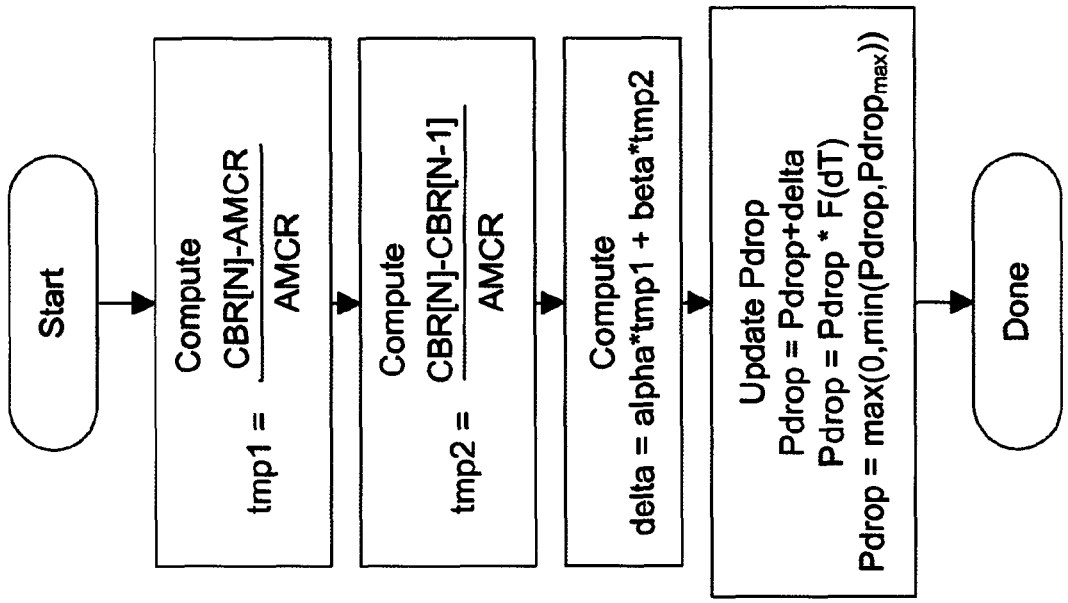
FIG. 22 is a flow chart for computing the Pdrop value according to another embodiment.

Another more advanced example is to implement a PID (Proportional Integral Derivative) controller. A PD (Proportional Derivative) example is shown in FIG. 22. The flow described in this chart is executed at regular instants given by a timer. Lost packets and ECN-CE marked packets are treated separately ($Pdrop_{Lost}$ is computed based on packets lost and $Pdrop_{Ce}$ is computed based on ECN-CE marked packets). N depicts the current event (report received). N-1 depicts the previous event. F(dT) is a function of the time since the last received report with output values limited to the range [0 . . . 1].

The alpha and beta values depend on various conditions such as the interval between reports and also the Pdrop value itself. The alpha value controls how much Pdrop should change based on the difference between the congestion bitrate and AMCR whereas beta controls the responsiveness to changes in congestion bitrate.

An additional function is to scale the Pdrop values depending on the time since the last received congestion report. A prolonged time since the last received congestion report will cause the Pdrop value to decrease to zero. This makes it possible to send congestion reports only when bytes are actually lost or ECN-CE marked, something that can save signaling overhead.

Figure 23:
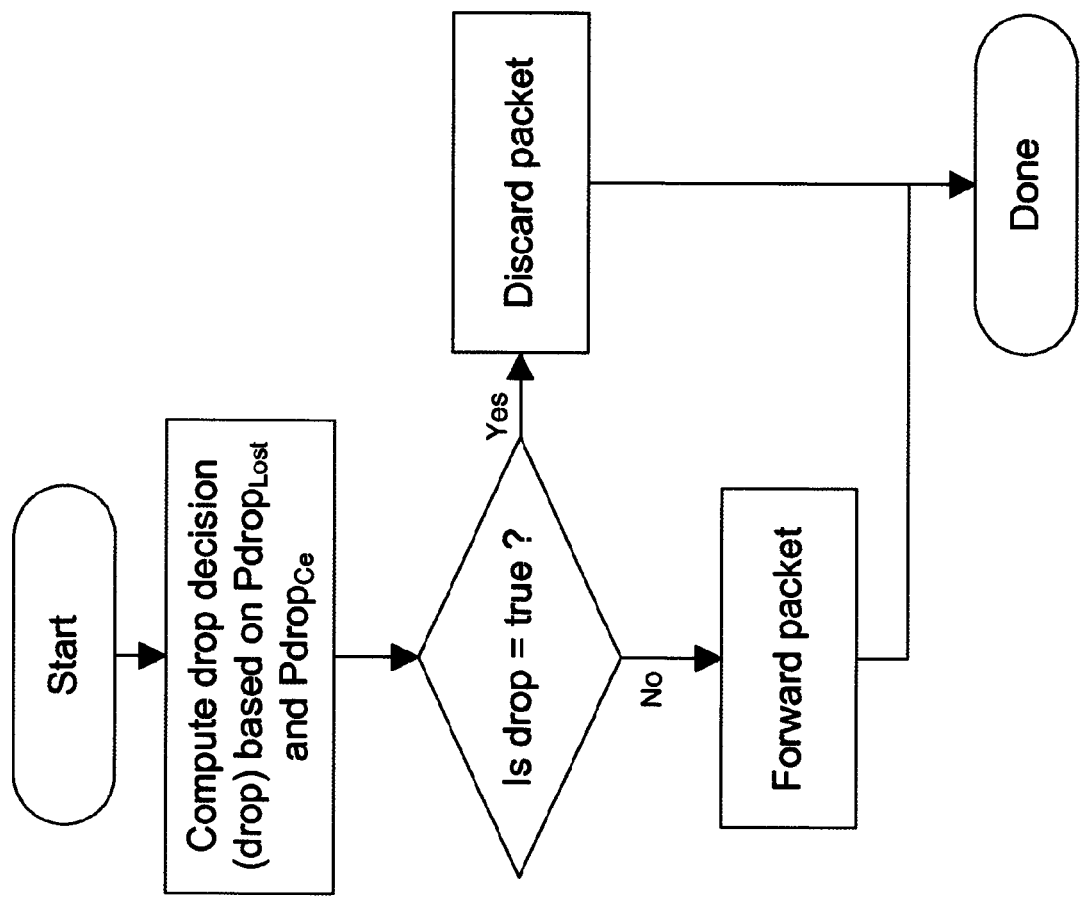
FIG. 23 is a flow chart for packet dropping according to an embodiment.

The dropper finally drops incoming packets based on the combined $Pdrop_{Lost}$ and $Pdrop_{Ce}$ values; see for example the embodiment shown in FIG. 23. The flow described in this chart is executed for each new incoming packet. High Pdrop values increases the probability that incoming packets are dropped. It should be clear from the explanation and the figures above that bearers or connections that cause a congestion that is less than the congestion allowance will not experience any additional packet drops by the policer whereas bearers that exceed the congestion allowance will experience additional packet drops in the policer depending how much the allowance is exceeded.

In summary, some of the currently proposed embodiments comprise the following parts:
Method in a tunnel sender to transmit a Byte Sequence Number (BSN) for each tunnel and in a tunnel receiver to track byte-wise traffic loss and traffic marked with ECN-CE codepoint (known as congestion volume information) per tunnel (user bearer or connection) using new proposed extensions to GTP-U, CAPWAP and GRE tunneling protocols.
Method in a tunnel endpoint to report congestion volume information to the tunnel peer (e.g. Serving Gateway (SGW), Wi-Fi Access Controller or Wi-Fi gateway) using new proposed extensions to GTP-U, CAPWAP and GRE tunneling protocols.
Method in a tunnel peer (e.g. SGW, Wi-Fi Access Controller, Wi-Fi gateway or PGW) to apply tunnel congestion policing based on the reported congestion volume information or to relay the congestion volume to the next tunnel upstream node (PGW) where congestion policing is applied.
Method in a tunnel peer for tuning the congestion bitrate calculation and the packet drop probability in the policer based on the congestion level and the congestion report interval. In addition, a method to gradually reduce the packet drop probability to zero if the time elapsed since the last congestion report exceeds a given threshold.

Some advantages of the proposed embodiments are:
Congestion management solution independent from UE terminals and Internet endpoints or other transport protocol (e.g. TCP) implementations.
Simple functions implemented on existing nodes without negatively impacting the performance of the mobile network.
Faster response to congestion with short feedback.
Consistent congestion volume policies controlled by mobile operator depending on the radio access technology and/or service mix.

In an example of an implementation, at least some of the steps, functions, procedures, modules and/or blocks described herein are implemented in a computer program, which is loaded into a memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The embodiments herein may thus be implemented through one or more processors, such as a respective processor in the network nodes depicted in FIGS. 5a-5c, and 6a-6c, together with respective computer program code for performing the functions and actions of the embodiments herein.

First Network Node

According to an embodiment, a first network node is configured to enable network congestion management in a wireless network. The first network node is configured to encapsulate and send user packets in a tunnel to a second network node, wherein each user packet comprises information related to a byte loss volume for the tunnel. The first network node is further configured to receive congestion volume information for the tunnel from the second network node. The first network node is also configured to either apply network congestion policing for the tunnel based on the received congestion volume information for the tunnel, or to forward the received congestion volume information for the tunnel to a third network node, to enable network congestion policing for the tunnel based on the received congestion volume information for said tunnel.

In an example embodiment, the information related to a byte loss volume for the tunnel comprises a byte sequence number (BSN), which is defined as the first byte of data in each user packet for the tunnel. In a particular embodiment, the byte sequence number is provided in a tunnel header for the user packet.

In an alternative embodiment, the information related to a byte loss volume for the tunnel comprises a packet sequence number for the tunnel. In a particular embodiment, the packet sequence number is provided in a tunnel header for the user packet.

In a particular embodiment, the first network node is further configured to apply network congestion policing for the tunnel based on a drop probability that a user packet destined to the second network node is discarded. In a particular embodiment, the first network node is configured to determine the drop probability based on an exit timestamp, which is comprised in the received congestion volume information, and which is defined as the best possible approximate time of the departure of the congestion volume information from the second network node.

In some example embodiments, the first network node may be an Evolved Node B (eNodeB), a NodeB, an Access Point (AP), a Serving Gateway (SGW), a Radio Network Controller (RNC), an Access Controller (AC), a tunnel-capable router, or a virtualized network function (VNF).

FIG. 5a is a schematic diagram illustrating an example of a first network node 10 operative to enable network congestion management in a wireless network according to an embodiment. In this example, the first network node 10 basically comprises a processor 11, an associated memory 12 and optional communication circuitry 13. The optional communication circuitry 13 is adapted for wireless and/or wired communication with one or more other nodes, including transmitting and/or receiving information.

As indicated in the specific example of FIG. 5a, the first network node 10 comprises a processor 11 and a memory 12, wherein the memory 12 comprises instructions executable by the processor 11 to perform operations of the first network node 10. Thus, in this example embodiment the processor 11 is operative to encapsulate user packets for sending in a tunnel to a second network node, wherein each user packet comprises information related to a byte loss volume for the tunnel. The processor 11 is further operative to read congestion volume information for said tunnel received from said second network node. The processor 11 is also operative either to apply network congestion policing for the tunnel based on received congestion volume information for the tunnel, or to prepare the received congestion volume information for the tunnel for forwarding to a third network node, to enable network congestion policing for the tunnel based on the received congestion volume information for the tunnel. As indicated in FIG. 5a, the first network node 10 may also include communication circuitry 13 for communication with one or more other nodes, including transmitting and/or receiving information. Thus, in a particular embodiment the first network node 10 comprises communication circuitry 13 configured to send encapsulated user packets in a tunnel to a second network node, wherein each user packet comprises information related to a byte loss volume for the tunnel. The communication circuitry 13 is further configured to receive congestion volume information for the tunnel from the second network node. The communication circuitry 13 may optionally be configured to forward the received congestion volume information for the tunnel to a third network node, to enable network congestion policing for the tunnel based on the received congestion volume information for the tunnel.

Second Network Node

According to an embodiment, a second network node is configured to enable network congestion management in a wireless network. The second network node is configured to receive encapsulated user packets in a tunnel from a first network node, wherein each received user packet comprises information related to a byte loss volume for the tunnel. The second network node is further configured to determine congestion volume information for the tunnel based on the information related to a byte loss volume for the tunnel. The second network node is also configured to send the determined congestion volume information for the tunnel to the first network node, to enable network congestion policing for the tunnel based on the determined congestion volume information for the tunnel.

As described above, the information related to a byte loss volume for the tunnel may in one embodiment comprise a byte sequence number for the tunnel. In this embodiment, the second network node is configured to detect the byte loss volume for the tunnel when the received byte sequence number is larger than expected, i.e. larger than the byte sequence number of the preceding user packet plus the size of the user payload of the preceding user packet.

As described above, the information related to a byte loss volume for the tunnel may in one embodiment comprise a packet sequence number for the tunnel. In this embodiment, the second network node is configured to detect the byte loss volume for the tunnel when the received packet sequence number is larger than expected, i.e. larger than the packet sequence number of the preceding user packet plus 1.

In one embodiment, the second network node is configured to determine the congestion volume information for the tunnel based also on information related to a byte congested volume for the tunnel, where such information related to the byte congested volume for the tunnel may be comprised in the received user packets. In a particular embodiment, the information related to a byte congested volume for the tunnel comprises received user packets with Explicit Congestion Notification (ECN) markings provided in an IP header, indicating network congestion for the tunnel. In such an embodiment, the user packets sent from the first network node must of course comprise ECN markings indicating that the first network node is ECN-capable for the tunnel.

In some example embodiments, the second network node may be an Evolved Node B (eNodeB), a NodeB, an Access Point (AP), a Serving Gateway (SGW), a Radio Network Controller (RNC), an Access Controller (AC), a tunnel-capable router, or a virtualized network function (VNF).

FIG. 5b is a schematic diagram illustrating an example of a second network node 20 operative to enable network congestion management in a wireless network according to an embodiment. In this example, the second network node 20 basically comprises a processor 21, an associated memory 22 and optional communication circuitry 23. The optional communication circuitry 23 is adapted for wireless and/or wired communication with one or more other nodes, including transmitting and/or receiving information.

As indicated in the specific example of FIG. 5b, the second network node 20 comprises a processor 21 and a memory 22, wherein the memory 22 comprises instructions executable by the processor 21 to perform operations of the second network node 20. Thus, in this example embodiment the processor 21 is operative to read encapsulated user packets received in a tunnel from a first network node, wherein each received user packet comprises information related to a byte loss volume for the tunnel. The processor 21 is further operative to determine congestion volume information for the tunnel based on the information related to a byte loss volume for the tunnel. The processor 21 is also operative to prepare the determined congestion volume information for the tunnel for sending to the first network node, to enable network congestion policing for the tunnel based on the determined congestion volume information for the tunnel.

As indicated in FIG. 5b, the second network node 20 may also include communication circuitry 23 for communication with one or more other nodes, including transmitting and/or receiving information. Thus, in a particular embodiment the second network node 20 comprises communication circuitry 23 configured to receive encapsulated user packets in a tunnel from a first network node, wherein each received user packet comprises information related to a byte loss volume for the tunnel. The communication circuitry 23 is further configured to send congestion volume information for the tunnel to the first network node, wherein the congestion volume information for the tunnel is determined based on the information related to a byte loss volume for the tunnel, to enable network congestion policing for the tunnel based on the determined congestion volume information for the tunnel.

Third Network Node

According to an embodiment, a third network node is configured to manage network congestion in a wireless network. The third network node is configured to receive congestion volume information for a tunnel from a first network node, wherein the received congestion volume information is determined by a second network node and forwarded by the first network node, and to apply network congestion policing for the tunnel based on the received congestion volume information for the tunnel.

In a particular embodiment, the third network node is further configured to apply network congestion policing for the tunnel based on a drop probability that a user packet destined to the first network node is discarded. In a particular embodiment, the third network node is configured to determine the drop probability based on an exit timestamp, which is comprised in the received congestion volume information, and which is defined as the best possible approximate time of the departure of the congestion volume information from the second network node.

In some embodiments, the third network node may be a Packet Gateway (PGW), a Serving GPRS support node (SGSN), a Gateway GPRS support node (GGSN), a tunnel-capable router, or a virtualized network function (VNF).

FIG. 5c is a schematic diagram illustrating an example of a third network node 30 operable to manage network congestion in a wireless network according to an embodiment. In this example, the third network node 30 basically comprises a processor 31, an associated memory 32 and optional communication circuitry 33. The optional communication circuitry 33 is adapted for wireless and/or wired communication with one or more other nodes, including transmitting and/or receiving information.

As indicated in the specific example of FIG. 5c, the third network node 30 comprises a processor 31 and a memory 32, wherein the memory 32 comprises instructions executable by the processor 31 to perform operations of the third network node 30. Thus, in this example embodiment the processor 31 is operative to read congestion volume information for a tunnel received from a first network node, wherein the received congestion volume information is determined by a second network node and forwarded by the first network node. The processor 31 is further operative to apply network congestion policing for a tunnel based on the received congestion volume information for the tunnel.

As indicated in FIG. 5c, the third network node 30 may also include communication circuitry 33 for communication with one or more other nodes, including transmitting and/or receiving information. Thus, in a particular embodiment the third network node 30 comprises communication circuitry 33 configured to receive congestion volume information for a tunnel from a first network node, wherein the received congestion volume information is determined by a second network node and forwarded by the first network node.

Figure 6C:
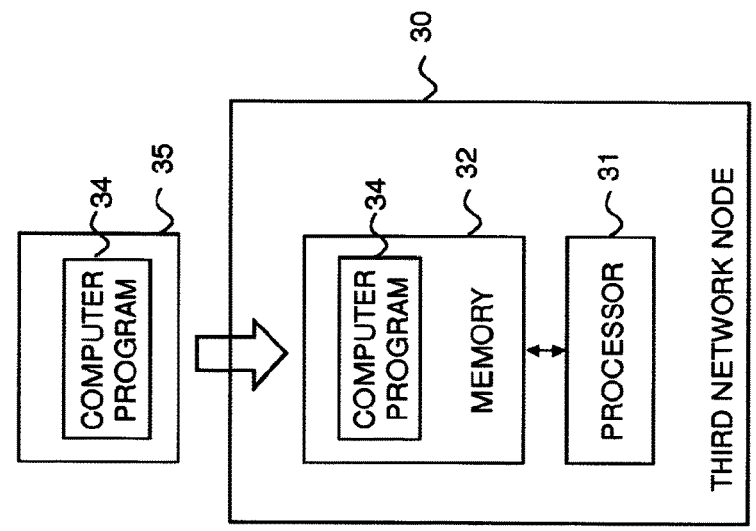
FIG. 6c is a schematic diagram illustrating an example of a third network node operative to manage network congestion in a wireless network according to an alternative embodiment.

As described above, at least some of the steps, functions, procedures, modules and/or blocks described above may be implemented in software such as a computer program for execution by suitable processing circuitry including one or more processing units. Examples of such implementations are schematically illustrated in FIGS. 6a-c.

Figure 6B:
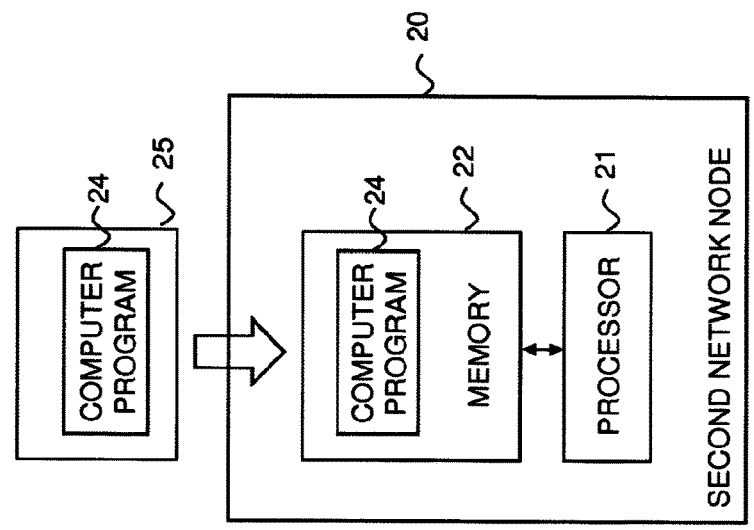
FIG. 6b is a schematic diagram illustrating an example of a second network node operative to enable network congestion management in a wireless network according to an alternative embodiment.
Figure 6A:
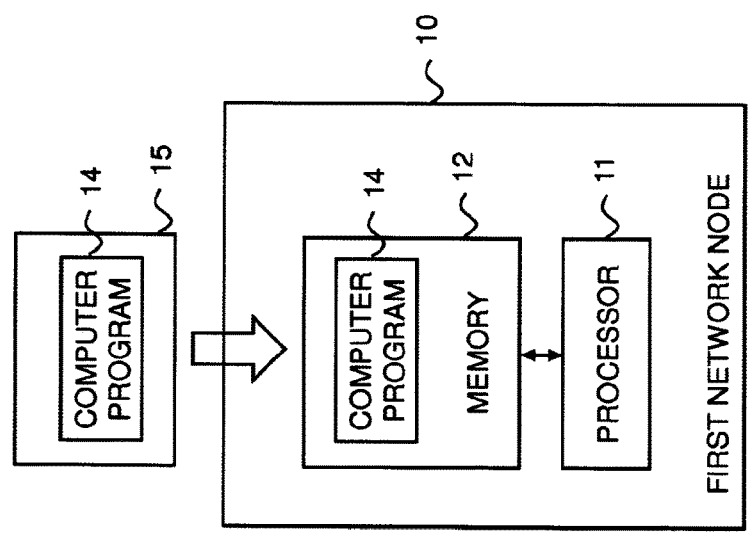
FIG. 6a is a schematic diagram illustrating an example of a first network node operative to enable network congestion management in a wireless network according to an alternative embodiment.

According to an embodiment, schematically illustrated in FIG. 6a, a computer program 14 comprises instructions, which when executed by at least one processor 11, cause the processor(s) to encapsulate user packets for sending in a tunnel from a first network node to a second network node, wherein each user packet comprises information related to a byte loss volume for the tunnel, to read congestion volume information for the tunnel received at the first network node, and also to either apply network congestion policing for the tunnel based on the received congestion volume information for the tunnel, or to prepare the received congestion volume information for the tunnel for forwarding to a third network node, to enable network congestion policing for the tunnel based on the received congestion volume information for the tunnel.

According to another embodiment, schematically illustrated in FIG. 6b, a computer program 24 comprises instructions, which when executed by at least one processor 21, cause the processor(s) to read encapsulated user packets received at a second network node sent in a tunnel from a first network node, wherein each of the received user packets comprises information related to a byte loss volume for the tunnel, to determine congestion volume information for the tunnel based on the information related to a byte loss volume for the tunnel, and to prepare the determined congestion volume information for the tunnel for sending from the second network node to the first network node, to enable network congestion policing for the tunnel based on the determined congestion volume information for the tunnel.

According to particular embodiment of the computer program 24 of FIG. 6b, each received user packet further comprises information related to a byte congested volume for the tunnel, and the congestion volume information for the tunnel is further based on the information related to a byte congested volume for the tunnel. In a particular embodiment, the information related to a byte congested volume for the tunnel comprises received user packets with Explicit Congestion Notification (ECN) markings provided in an IP header, indicating network congestion for the tunnel. In such an embodiment, the user packets sent from the first network node must of course comprise ECN markings indicating that the first network node is ECN-capable for the tunnel.

According to yet another embodiment, a computer program 34 comprises instructions, which when executed by at least one processor 31, cause the processor(s) to read congestion volume information for a tunnel received from a first network node, wherein the received congestion volume information is determined by a second network node and forwarded by the first network node, and to apply network congestion policing for the tunnel based on the received congestion volume information for the tunnel.

By way of example, the software or computer program may be realized as a computer program product, which is normally carried or stored on a computer-readable medium, in particular a non-volatile medium. The computer-readable medium may include one or more removable or non-removable memory devices including, but not limited to a Read- Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology also provides a carrier 15; 25; 35, illustrated in FIGS. 6a-c, and comprising one or more of the above computer programs 14; 24; 34, wherein the carrier is one of an electronic signal, an optical signal, an electromagnetic signal, a magnetic signal, an electric signal, a radio signal, a microwave signal, or a computer-readable storage medium.

The flow diagram or diagrams presented above may be regarded as a computer flow diagram or diagrams, when performed by one or more processors. A corresponding network node may be defined as a group of function modules, where each step performed by the processor corresponds to a function module. In this case, the function modules are implemented as a computer program running on the processor. Hence, the network nodes may alternatively be defined as a group of function modules, where the function modules are implemented as a computer program running on at least one processor.

Hence, the computer program residing in memory may be organized as appropriate function modules configured to perform, when executed by the processor, at least part of the steps and/or tasks described herein. Examples of such function modules are illustrated in FIGS. 7a-c.

Figure 7A:
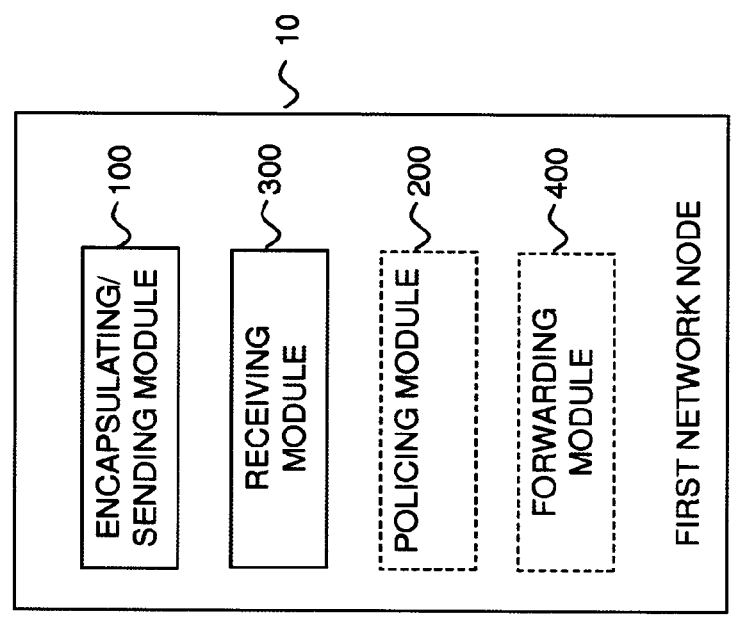
FIG. 7a is a schematic block diagram illustrating an example of a first network node for enabling network congestion management in a wireless network according to an alternative embodiment.
Figure 7C:
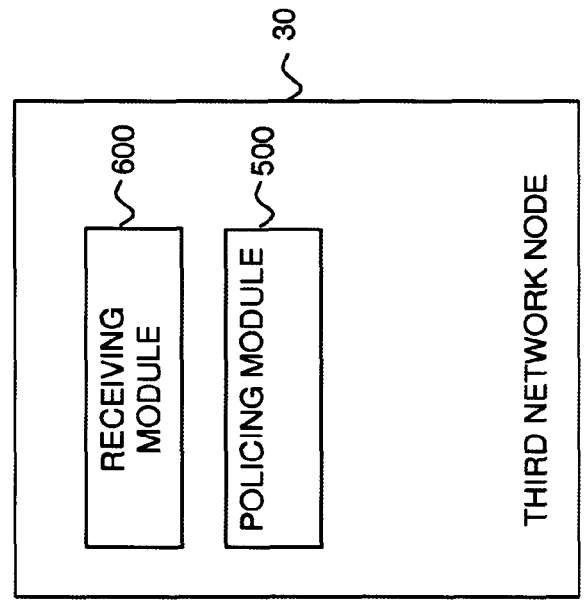
FIG. 7c is a schematic block diagram illustrating an example of a third network node for managing network congestion in a wireless network according to an alternative embodiment.

FIG. 7a is a schematic block diagram illustrating an example of a first network node 10 for enabling network congestion management in a wireless network according to an embodiment. In this example, the first network node 10 comprises an encapsulating/sending module 100 for encapsulating user packets for sending in a tunnel to a second network node, wherein each user packet comprises information related to a byte loss volume for the tunnel. The first network node 10 further comprises a receiving module 300 for reading congestion volume information for the tunnel, received from the second network node. The first network node 10 also may comprise a policing module 200 for applying network congestion policing for the tunnel based on the received congestion volume information for the tunnel, and/or a forwarding module 400 for preparing the received congestion volume information for the tunnel for forwarding to a third network node, to enable network congestion policing for the tunnel based on the received congestion volume information for the tunnel. The first network node 10 may comprise either the policing module 200 or the forwarding module 200, or both. This is illustrated by the dashed lines in FIG. 7a.

Figure 7B:
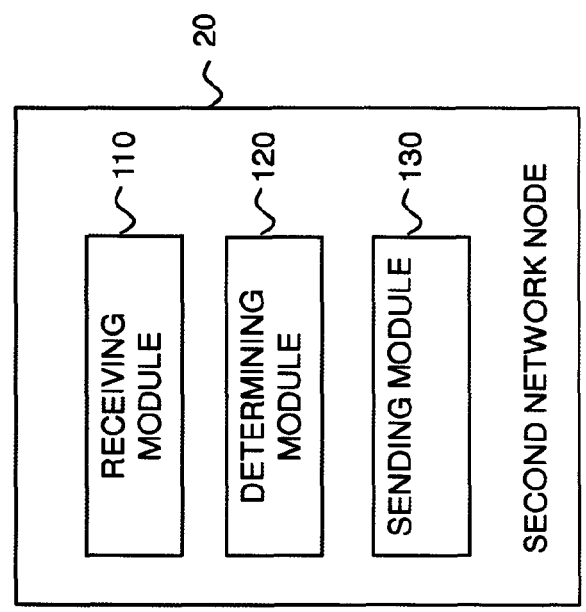
FIG. 7b is a schematic block diagram illustrating an example of a second network node for enabling network congestion management in a wireless network according to an alternative embodiment.

FIG. 7b is a schematic block diagram illustrating an example of a second network node 20 for enabling network congestion management in a wireless network according to an embodiment. In this example, the second network node 20 comprises a receiving module 110 for reading encapsulated user packets received in a tunnel from a first network node, wherein each received user packet comprises information related to a byte loss volume for the tunnel. The second network node 20 further comprises a determining module 120 for determining congestion volume information for the tunnel, based on the information related to a byte loss volume for the tunnel. The second network node 20 also comprises a sending module 130 for preparing the determined congestion volume information for the tunnel for sending to the first network node, to enable network congestion policing for the tunnel based on the determined congestion volume information for the tunnel.

In a particular embodiment, the determining module 120 determines the congestion volume information for the tunnel based also on information related to a byte congested volume for the tunnel, where such information related to the byte congested volume for the tunnel may be comprised in the received user packets. In a particular embodiment, the information related to a byte congested volume for the tunnel comprises received user packets with Explicit Congestion Notification (ECN) markings provided in an IP header, indicating network congestion for the tunnel. In such an embodiment, the user packets sent from the first network node must of course comprise ECN markings indicating that the first network node is ECN-capable for the tunnel.

FIG. 7c is a schematic block diagram illustrating an example of a third network node 30 for managing network congestion in a wireless network according to an embodiment. In this example, the third network node 30 comprises a receiving module 600 for reading congestion volume information for a tunnel, received from a first network node, wherein the received congestion volume information is determined by a second network node and forwarded by the first network node. The third network node 30 further comprises a policing module 500 for applying network congestion policing for the tunnel based on the received received congestion volume information for the tunnel.

When using the word "comprise" or "comprising" it shall be interpreted as non-limiting, i.e. meaning "consist at least of".

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, network control nodes such as network controllers, radio network controllers, base station controllers, and the like, as well as to wireless devices such as exemplified above. In particular, the term "base station" may encompass different types of radio base stations including standardized base stations such as Node Bs, or evolved Node Bs, (eNodeBs), and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described above.

The processing circuitry does not have to be dedicated to only execute the above-described steps, functions, procedure and/or blocks, but may also execute other tasks.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

| Abbreviation | Explanation |
| --- | --- |
| AMBR | Aggregate Maximum Bit Rate |
| AMCR | Aggregate Maximum Congestion bitrate |
| AP | Access Point |
| APN | Access Point Name |
| AC | Access Controller |
| BB | Bandwidth Bottleneck |
| BPS | Bits Per Second |
| CAPWAP | Control and Provisioning of Wireless Access Points |
| CDO | ConEx Destination Option |
| CE | Congestion Experienced |
| CBR | Congestion Bitrate |
| CONEX | Congestion Exposure |
| DL | Downlink |
| DSCP | Diffserv Codepoint |
| ECN | Explicit Congestion Notification |
| EPC | Evolved Packet Core |
| E-UTRAN | Evolved UMTS Terrestrial Radio Access Network |
| eNB | E-UTRAN NodeB |
| GBR | Guaranteed Bit Rate |
| GRE | Generic Routing Encapsulation |
| GTP | GPRS Tunneling Protocol |
| GTP-U | GTP User |
| IP | Internet Protocol |
| IPsec | IP Security |
| IE | Information Element |
| Kb | Kilo Bytes |
| LAN | Local Area Network |
| LTE | Long Term Evolution |
| MME | Mobility Management Entity |
| MB | Mega Bytes |
| NMS | Network Management System |
| NTP | Network Time Protocol |
| OAM | Operations, Administration and Management |
| PID | Proportional Integral Derivative |
| PD | Proportional Derivative |
| PDN | Packet Data Network |
| PGW | PDN Gateway |
| RTT | Round-trip |
| SACK | Selective Acknowledgement |
| SGW | Serving Gateway |
| SN | Sequence Number |
| TCP | Transmission Control Protocol |
| TEID | Tunnel Endpoint Identifier |
| UDP | User Datagram Protocol |
| UE | User Equipment |
| Uu | Interface between the eNB and UE |
| WLAN | Wireless Local Area Network |

REFERENCES

[1] GPRS Tunneling Protocol User Plane (GTPv1-U), 3GPP TS 29.281

[2] Control and Provisioning of Wireless Access Points (CAPWAP), IETF,RFC 5415

[3] Generic Routing Encapsulation, IETF, RFC 2784

[4] E-UTRAN Access, 3GPP TS 23.401

[5] The Addition of Explicit Congestion Notification (ECN) to IP, IETF, RFC 3168

[6] Congestion Exposure Concepts and Use Cases, IETF, RFC 6789

[7] IPv6 Destination Option for ConEx, draft-ietf-conex-destopt-06

[8] TCP Selective Acknowledgment Options, IETF, RFC 2018

[9] Security Architecture for the Internet Protocol, IETF, RFC 4301

[10] Localized Congestion Exposure, Zhang et al, US2012/0051216 A1

[11] Byte and Packet Congestion Notification, IETF, draft-briscoe-tsvwg-byte-pkt-mark-02

[12] Point-to-Point Tunneling Protocol, IETF, RFC 2637

[13] Key and Sequence Number Extensions to GRE, IETF, RFC 2890

[14] Network Time Protocol Version 4: Protocol and Algorithms Specification, RFC 5905

The invention claimed is:

1. A method performed by a first network node for enabling network congestion management in a wireless network, wherein said method comprises the steps of:
encapsulating and sending user packets in a tunnel to a second network node, wherein each of said user packets comprises information related to a byte loss volume for said tunnel, said information related to a byte loss volume for said tunnel comprising a byte sequence number, defined as a first byte of data in each of said user packets, for said tunnel where said byte sequence number is included in a header for said tunnel; and receiving congestion byte loss volume information for said tunnel from said second network node; and performing one of the following steps:

applying network congestion policing for said tunnel based on said received congestion byte loss volume information for said tunnel; and forwarding said received congestion byte loss volume information for said tunnel to a third network node, to enable network congestion policing for said tunnel based on said received congestion byte loss volume information for said tunnel.

2. The method according to claim 1, wherein said applying network congestion policing for said tunnel is further based on a drop probability that a user packet destined to said second network node is discarded.

3. The method according to claim 2, wherein said received congestion byte loss Volume information for said tunnel comprises an exit timestamp defined as the best possible approximate time of the departure of said congestion byte loss volume information from said second network node, and wherein said drop probability is based on said exit timestamp.

4. A method performed by a second network node for enabling network congestion management in a wireless network, wherein said method comprises the steps of:

receiving encapsulated user packets in a tunnel from a first network node, wherein each of said received user packets comprises information related to a byte loss volume for said tunnel, said information related to a byte loss volume for said tunnel comprising a byte sequence number, defined as a first byte of data in each of said user packets, for said tunnel where said byte sequence number is included in a header for said tunnel;

determining congestion byte loss volume information for said tunnel, based on said information related to a byte loss volume for said tunnel, wherein a byte loss volume for said tunnel is detected when a received byte sequence number is larger than a byte sequence number of a preceding user packet plus a size of a user payload of said preceding user packet; and sending said determined congestion byte loss volume information for said tunnel to said first network node, to enable network congestion policing for said tunnel based on said determined congestion byte loss volume information for said tunnel.

5. The method according to claim 4, wherein each of said received user packets further comprises information related to a byte congested volume for said tunnel, and wherein congestion byte loss volume information for said tunnel is further based on said information related to a byte congested volume for said tunnel.

6. The method according to claim 5, wherein said information related to a byte congested volume for said tunnel comprises received user packets further comprising Explicit Congestion Notification, ECN, markings provided in an Internet Protocol, IP, header, indicating network congestion for said tunnel.

7. A method performed by a third network node for managing network congestion in a wireless network, wherein said method comprises the steps of:

receiving congestion byte loss volume information for a tunnel from a first network node, wherein said received congestion byte loss volume information is determined by a second network node and forwarded by said first network node; and applying network congestion policing for said tunnel based on said received congestion byte loss volume information for said tunnel.

8. The method according to claim 7, wherein said applying network congestion policing for said tunnel is further based on a drop probability that a user packet destined to said first network node is discarded.

9. The method according to claim 8, wherein said received congestion byte loss volume information for said tunnel comprises an exit timestamp defined as the best possible approximate time of the departure of said congestion byte loss volume information from said second network node, and wherein said drop probability is based on said exit timestamp.

10. A first network node configured to enable network congestion management in a wireless network, wherein said first network node is configured to encapsulate and send user packets in a tunnel to a second network node, wherein each of said user packets comprises information related to a byte loss volume for said tunnel, said information related to a byte loss volume for said tunnel comprising a byte sequence number, defined as a first byte of data in each of said user packets, for said tunnel where said byte sequence number is included in a header for said tunnel, and wherein said first network node is configured to receive congestion byte loss volume information for said tunnel from said second network node; and wherein said first network node is configured to one of the following:

apply network congestion policing for exit tunnel based on said received congestion byte loss volume information for said tunnel; and forward said received congestion byte loss volume information for said tunnel to a third network node, to enable network congestion policing for exit tunnel based on said received congestion byte loss volume information for said tunnel.

11. The first network node of claim 10, wherein the first network node is further configured to apply network congestion policing for said tunnel based on a drop probability that a user packet destined to exit second network node is discarded.

12. The first network node of claim 11, wherein said received congestion byte loss volume information for said tunnel comprises an exit timestamp defined as the best possible approximate time of the departure of said congestion byte loss volume information from said second network node, and wherein the first network node is configured to determine sad drop probability based on said exit timestamp.

13. The first network node of claim 10, wherein the first network node is one of the following:

an Evolved Node B, eNodeB; a NodeB;
an Access Point, AP;
a Serving Gateway, SGW;
a Radio Network Controller, RNC;
an Access Controller, AC;
a tunnel-capable router; and
a virtualized network function, VNF.

14. The first network node of claim 10, wherein the first network node comprises a processor and a memory, said memory comprising instructions executable by the processor, whereby the processor is operative to:

encapsulate user packets for sending in a tunnel to a second network node, wherein each of said user packets comprises information related to a byte loss volume for said tunnel, said information related to a byte loss volume for said tunnel comprising a byte sequence number, defined as a first byte of data in each of said user packets, for said tunnel; and to:
read congestion byte loss volume information for said tunnel received from said second network node; and one of the following:
apply network congestion policing for said tunnel based on said received congestion byte loss volume information for said tunnel; and
prepare said received congestion byte loss volume information for said tunnel for forwarding to a third network node, to enable network congestion policing for said tunnel based on said received congestion byte loss volume information for said tunnel.

15. The first network node of claim 10. wherein the first network node comprises communication circuitry configured to send encapsulated user packets in a tunnel to a second network node wherein each of said user packets comprises information related to a byte loss volume for said tunnel, said information related to a byte loss volume for said tunnel comprising a byte sequence number, defined as a first byte of data in each of said user packets, for said tunnel, to receive congestion byte loss volume information for said tunnel from said second network node, and optionally to forward said received congestion byte loss volume information for said tunnel to a third network node to enable network congestion policing for exit tunnel based on said received congestion byte loss volume information for said tunnel.

16. A second network node configured to enable network congestion management in a wireless network, wherein said second network node is configured to receive encapsulated user packets in a tunnel from a first network node, wherein each of said received user packets comprises information related to a byte loss volume for said tunnel. said information related to a byte loss volume for said tunnel comprising a byte sequence number, defined as a first byte of data in each of said user packets, for exit tunnel where said byte sequence number is included in a header for said tunnel: and
wherein said second network node is configured to determine congestion byte loss volume information for said tunnel, based on said information related to a byte loss volume for said tunnel, said second network node being configured to detect a byte loss volume for said tunnel when a received byte sequence number is larger than a byte sequence number of a preceding user packet plus a size of a user payload of exit preceding user packet; and
wherein said second network node is configured to send said determined congestion byte loss volume information for said tunnel to said first network node, to enable network congestion policing for said tunnel based on exit determined congestion byte loss volume information for said tunnel.

17. The second network node of claim 16, wherein each of said received user packets further comprises information related to a byte congested volume for said tunnel, and wherein said second network node is configured to determine said congestion byte loss volume information for exit tunnel based also on said information related to a byte congested volume for said tunnel.

18. The second network node of claim 17, wherein said information related to a byte congested volume for said tunnel comprises received user packets further comprising Explicit Congestion Notification, ECN, markings provided in an Internet Protocol, IP, header, indicating network congestion for said tunnel.

19. The second network node of claim 16, wherein the second network node is one of the following:
an Evolved Node B, eNodeB;
a NodeB;
an Access Point, AP;
a Serving Gateway, SGW;
a Radio Network Controller, RNC;
an Access Controller, AC;
a tunnel-capable router;
a virtualized network function, VNF.

20. The second network node of claim 16, wherein the second network node comprises a processor and a memory, said memory comprising instructions executable by the processor, whereby the processor is operative to:
read encapsulated user packets received in a tunnel from a first network node, wherein each of said received user packets comprises information related to a byte loss volume for said tunnel, said information related to a byte loss volume for sad tunnel comprising a byte sequence number, defined as a first byte of data in each of said user packets, for said tunnel;
determine congestion byte loss volume information for said tunnel, based on exit information related to a byte loss volume for said tunnel, wherein a byte loss volume for said tunnel is detected when a received byte sequence number is larger than a byte sequence number of a preceding user packet plus a size of a user payload of said preceding user packet; and to
prepare said determined congestion byte loss volume information for said tunnel for sending to said first network node, to enable network congestion policing for said tunnel based on said determined congestion byte loss volume information for said tunnel.

21. The second network node of claim 16, wherein the second network node comprises communication circuitry configured to receive encapsulated user packets in a tunnel from a first network node, wherein each of said received user packets comprises information related to a byte loss volume for said tunnel, said information related to a byte loss volume for said tunnel comprising a byte sequence number, defined as a first byte of data in each of said user packets, for said tunnel; and to send congestion byte loss volume information for said tunnel to said first network node, wherein said congestion byte loss volume information for said tunnel is determined based on said Information related to a byte loss volume for said tunnel, wherein a byte loss volume for sad tunnel is detected when a received byte sequence number is larger than a byte sequence number of a preceding user packet plus a size of a user payload of said preceding user packet, to enable network congestion policing for said tunnel based on said determined congestion byte loss volume Information for said tunnel.

22. A third network node configured to manage network congestion in a wireless network, wherein said third network node is configured to receive congestion byte loss volume information for a tunnel from a first network node, wherein said received congestion byte loss volume information is determined by a second network node and forwarded by said first network node; and
wherein said third network node is configured to apply network congestion policing for said tunnel based on said received congestion byte loss volume information for said tunnel.

23. The third network node of claim 22, wherein the third network node is further configured to apply network congestion policing for said tunnel based on a drop probability that a user packet destined to said first network node is discarded.

24. The third network node of claim 23, wherein said received congestion byte loss volume information for said tunnel comprises an exit timestamp defined as the best possible approximate time of the departure of said congestion byte loss volume information from said second network node, and wherein the third network node is configured to determine said drop probability based on said exit timestamp.

25. The third network node of claim 22, wherein the third network node is one of the following:
  a Packet Gateway, PGW;
  a Serving GPRS support node, SGSN;
  a Gateway CPRS support node, GGSN;
  a tunnel-capable router;
  a virtualized network function, VNF.

26. The third network node of claim 22, wherein the third network node comprises a processor and a memory, said memory comprising instructions executable by the processor, whereby the processor is operative to:
  read congestion byte loss volume information for a tunnel received from a first network node, wherein said received congestion byte loss volume information is determined by a second network node and forwarded by said first network node; and to:
  apply network congestion policing for said tunnel based on said received congestion byte loss volume information for said tunnel.

27. The third network node of claim 22, wherein the third network node comprises communication circuitry configured to receive congestion byte loss volume information for a tunnel from a first network node, wherein said received congestion byte loss volume information is determined by a second network node and forwarded by said first network node.

28. A computer program comprising instructions stored in a non-transitory medium, which when executed by at least one processor, cause the processor or processors to:
  encapsulate user packets for sending in a tunnel from a first network node to a second network node, wherein each of said user packets comprises information related to a byte loss volume for said tunnel, said information related to a byte loss volume for said tunnel comprising a byte sequence number, defined as a first byte of data in each of said user packets, for said tunnel where said byte sequence number is included in a header for said tunnel; and
  read congestion byte loss volume information for said tunnel received at said first network node from said second node; and do one of the following:
    apply network congestion policing for said tunnel based on said received congestion byte loss volume information for said tunnel; and
    prepare said received congestion byte loss volume information for said tunnel for forwarding to a third network node, to enable network congestion policing for said tunnel based on said received congestion byte loss volume information for said tunnel.

29. A computer program comprising instructions stored in a non-transitory medium, which when executed by at least one processor, cause the processor or processors to:
  read encapsulated user packets received at a second network node sent in a tunnel from a first network node, wherein each of said received user packets comprises information related to a byte loss volume for said tunnel, said information related to a byte loss volume for said tunnel comprising a byte sequence number, defined as a first byte of data in each of said user packets, for said tunnel where said byte sequence number is included in a header for said tunnel;
  determine congestion byte loss volume information for said tunnel, based on said information related to a byte loss volume for said tunnel, wherein a byte loss volume for said tunnel is detected when a received byte sequence number is larger than a byte sequence number of a preceding user packet plus a size of a user payload of said preceding user packet; and to
  prepare said determined congestion byte loss volume information for said tunnel for sending from exit second network node to said first network node, to enable network congestion policing for said tunnel based on said determined congestion byte loss volume information for said tunnel.

30. The computer program of claim 29, wherein each of said received user packets further comprises information related to a byte congested volume for said tunnel, and wherein said congestion byte loss volume Information for said tunnel is further based on said information related to a byte congested volume for said tunnel.

31. A computer program comprising instructions stored in a non-transitory medium, which when executed by at least one processor, cause the processor or processors to:
  read congestion byte loss volume information for a tunnel received from a first network node, wherein said received congestion byte loss volume information is determined by a second network node and forwarded by said first network node; and:
  apply network congestion policing for said tunnel based on said received congestion byte loss volume information for said tunnel.

* * * * *